United States Patent [19]
Shigehara et al.

[11] Patent Number: 6,144,784
[45] Date of Patent: Nov. 7, 2000

[54] OPTICAL INPUT/OUTPUT MODULE AND LIGHT-REFLECTING DEVICE

[75] Inventors: Masakazu Shigehara; Shinji Ishikawa; Motoki Kakui; Hiroo Kanamori; Masayuki Nishimura, all of Yokohama, Japan

[73] Assignee: Sumitomo Electric Industries, Ltd., Osaka, Japan

[21] Appl. No.: 09/209,419

[22] Filed: Dec. 11, 1998

[30] Foreign Application Priority Data

Dec. 11, 1997 [JP] Japan ................................. 9-341732

[51] Int. Cl.[7] ...................................................... G02B 6/28
[52] U.S. Cl. .............................................................. 385/24
[58] Field of Search ................................. 385/24, 31, 44, 385/45, 47, 49, 14, 10, 37, 9; 359/115, 124, 109; 356/73.1; 372/102

[56] References Cited

U.S. PATENT DOCUMENTS

| 5,093,890 | 3/1992 | Bregman et al. ...................... 385/146 |
| 5,504,772 | 4/1996 | Deacon et al. ........................... 385/16 |
| 5,630,004 | 5/1997 | Deacon et al. ......................... 385/129 |
| 5,724,127 | 3/1998 | Csipkes et al. ....................... 356/73.1 |
| 5,764,825 | 6/1998 | Mugino et al. ........................... 385/24 |

OTHER PUBLICATIONS

Mizunami et al., "Computer Controlled Fiber Bragg Gratings", 22nd European Conference on Optical Communication—ECOC'96, Oslo, (No date).

Ohn et al., "Tunable Fiber Grating Dispersion Using A Piezoelectric Stack", OFC '97 Technical Digest, pp. 155–156, (No month).

Miyakawa et al., "An Experiment on Optical Add–Drop Multiplexer Using Fiber Grating and It's Limiting Factor", The Institute of Electronics, Information and Communication Engineers, General Conference 1996, pp. 747–748, (No month).

*Primary Examiner*—Akm E. Ullah
*Attorney, Agent, or Firm*—Pillsbury, Madison & Sutro LLP

[57] ABSTRACT

The present invention relates to an optical I/O module and light-reflecting device comprising a structure excellent in expandability having a high degree of freedom in designing. The optical I/O module according to the present invention comprises a directional coupler having, at least, input and output ports for constituting a part of a transmission line and an intermediate port for constituting a branch; and a light-reflecting device, optically connected to the intermediate port, for transmitting therethrough a specific wavelength. This structure can realize various configurations which allow a specific wavelength to be dropped from the transmission line and to be added to the transmission line, without influencing the configuration of the transmission line.

17 Claims, 16 Drawing Sheets

OPTICAL INPUT/OUTPUT MODULE AND LIGHT-REFLECTING DEVICE

TITLE OF THE INVENTION

Optical Input/Output Module and Light-Reflecting Device

BACKGROUND OF THE INVENTION

1. Field of the Invention

The present invention relates to an optical I/O module such as an optical add-drop multiplexer which drops a given wavelength component from signal light having a plurality of wavelength components and adds a given wavelength component to the signal light, and a light-reflecting device suitable for the optical I/O module.

2. Related Background Art

In the field of wavelength-division multiplexing (WDM) transmission, attention has been drawn to the add-drop multiplexer (ADM), as an optical I/O module, which drops a given wavelength component from WDM signal light having a plurality of wavelength components and adds a given wavelength component to the signal light. An example of the ADM is disclosed, for example, in the publication titled "Optical ADM Experiments Using Fiber Grating and Limiting Factors thereof," the Institute of Electronics, Information and Communication Engineers, General Conference 1996, SB-11-7, p. 747–748.

As shown in FIG. 1, the ADM disclosed in the above-mentioned publication is disposed in an optical fiber main line MF (transmission line) in a communication network via an input connector $C_{in}$ and an output connector $C_{out}$. In this ADM, a part of the transmission line is constituted by two pieces of optical circulators $OC_1$, $OC_2$ and a transmission type optical fiber grating FG. The optical fiber grating FG has such a demultiplexing characteristic that it reflects, of WDM signal light including a plurality of wavelength components $\lambda_1$ to $\lambda_n$, only a predetermined wavelength component $\lambda_i$, and transmits therethrough the rest of wavelength components $\lambda_1$ to $\lambda_{i-1}$, $\lambda_{i+1}$ to $\lambda_n$.

When the WDM signal light including a plurality of wavelength components $\lambda_1$ to $\lambda_n$ enters the AMD from the upstream side of the main line MF via the connector $C_{in}$, the WDM signal light propagates from a port $P_1$ of the optical circulator $OC_1$ to a port $P_2$ thereof, thereby reaching the optical fiber grating FG. The wavelength components $\lambda_1$ to $\lambda_{i-1}$, $\lambda_{i+1}$ to $\lambda_n$, transmitted through the optical fiber grating FG successively pass through ports $P_4$ and $P_5$ of the optical circulator $OC_2$, so as to be emitted to the downstream side of the optical fiber main line MF via the connector $C_{out}$. The wavelength component $\lambda_i$ reflected by the optical fiber grating FG is dropped to the dropping port $P_3$.

On the other hand, a wavelength component $\lambda_I$ at the same wavelength as the wavelength component $\lambda_i$ is added to the adding port $P_6$ of the optical circulator $OC_2$. Thus added wavelength component $\lambda_I$ propagates to the port $P_4$ by way of the port $P_6$, and then is reflected by the optical fiber grating FG. Thus reflected wavelength component $\lambda_I$ successively passes through the ports $P_4$ and $P_5$, so as to be emitted to the downstream side of the optical fiber main line MF via the connector $C_{out}$ as WDM signal light including the wavelength component $\lambda_I$ in addition to the wavelength components $\lambda_1$ to $\lambda_{i-1}$, $\lambda_{i+1}$ to $\lambda_n$.

Thus, the conventional ADM realizes the drop and addition of a given wavelength component by serially connecting the two optical circulators $OC_1$, $OC_2$ and the transmission type optical fiber grating FG in the optical fiber main line MF (thereby constituting a part of the transmission line).

SUMMARY OF THE INVENTION

Having studied the conventional optical I/O modules, the inventors have found the following problems. Namely, since the conventional optical I/O modules such as optical add-drop multiplexers are configured such that the transmission type optical fiber grating FG is serially connected to the optical fiber main line MF, when changing or supplementing a demultiplexing characteristic for dropping and adding a given wavelength component, it is necessary to physically break the optical fiber main line MF so as to install a separate ADM. Thus, in the conventional ADM, since the communication network must be placed in a disconnected state when changing or supplementing a demultiplexing characteristic, such a changing operation and the like cannot easily be effected. Also, there have been strict restrictions on the expandability and the like thereof when constructing WDM optical communication networks with a large capacity. Further, when changing or supplementing a demultiplexing characteristic, a number of expensive optical circulators having a complicated structure and the like are required.

In view of the above-mentioned problems, it is an object of the present invention to provide an optical I/O module such as optical add-drop multiplexer which has an excellent expandability and is easy to handle and inexpensive, and a light-reflecting device suitable for the optical I/O module.

The present invention relates to an optical I/O module arranged in a transmission line suitable for long-haul, large-capacity transmission such as WDM transmission. In order to constitute a part of the transmission line through which WDM signal light including one or more wavelength components propagate, this optical I/O module comprises an input terminal for capturing the WDM signal light propagating through the transmission line and an output terminal for guiding the WDM signal light to the transmission line.

Specifically, the optical I/O module according to the present invention comprises, at least, a light-reflecting device for reflecting a part of the wavelength components included in the WDM signal light; and a directional coupler having a first port device as an input port optically connected to the input terminal, a second port device as an output port optically connected to the output terminal, and a third port device as an intermediate port optically connected to the light-reflecting device.

In this arrangement, first signal light from the input terminal captured via the first port device is guided to the light-reflecting device by way of the third port device, and the reflected component from the light-reflecting device captured via the third port device is guided to the output terminal by way of the second port device. Consequently, in the optical I/O module according to the present invention, the first and second port devices, via the directional coupler, constitute a part of the transmission line (main line). On the other hand, since the light-reflecting device is provided so as to be optically connected to the third port device constituting a branch of the transmission line, it realizes a structure which can freely select a wavelength component to be dropped from or added to the transmission line without influencing the configuration of the transmission line.

As the directional coupler, either an optical fiber coupler or an optical circulator may be employed. A plurality of directional couplers may be prepared to constitute the optical I/O module according to the present invention. As a consequence, various modifications can be effected in the structure capable of adding/dropping a given wavelength component, without influencing the configuration of the transmission line.

For example, the light-reflecting device can be provided with a joint member such as a detachable connector, so as to be replaceable with another light-reflecting device having a different demultiplexing characteristic. A plurality of light-reflecting units having different demultiplexing characteristics may be prepared as the light-reflecting device, and these light-reflecting units may be connected together in series to constitute a branch extending from the third port device. Also, a plurality of light-reflecting units having different demultiplexing characteristics may be prepared as the light-reflecting device, and the third port device may be constituted by a plurality of ports respectively corresponding to the plurality of light-reflecting units, thus making it easy to realize a plurality of parallel branches.

In addition, the light-reflecting device can easily be realized by an optical fiber grating whose refractive index periodically changes along the light-guiding direction. As the optical fiber grating, a chirped grating whose cycle of change in refractive index varies along the light-guiding direction may also be employed.

In particular, since the chirped grating is an optical fiber grating whose reflecting position shifts depending on the wavelength component to be reflected, the demultiplexing characteristic of a given position of the grating can be controlled so as to transmit therethrough a given wavelength component. In particular, the light-reflecting device may comprise an optical waveguide having an optical fiber grating such as chirped grating formed in a reflection area, and a conversion system for changing the demultiplexing characteristic of a part of the reflection area so as to transmit therethrough a desirable wavelength component in the wavelength components to be reflected in the reflection area of the optical waveguide.

The conversion system comprises a structure for applying at least one of heat, distortion, and light at a specific wavelength to a specific part of the reflection area. Also, in order to enable highly accurate wavelength control, the conversion system preferably has a plurality of conversion units arranged along the optical waveguide and prepared so as to correspond to the individual parts of the reflection area where at least one of heat, distortion, and light at a specific wavelength is applied.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 6A is a graph showing a normalized refractive index distribution of a chirped grating whose cycle of change in refractive index gradually changes along its longitudinal direction, whereas

FIG. 7A is a graph showing a normalized refractive index distribution of a chirped grating whose refractive index gradually changes along its longitudinal direction with a constant cycle of change in refractive index, whereas

FIG. 8A is a graph showing a normalized refractive index distribution of the chirped grating shown in FIG. 7A when heat is applied to a part thereof, whereas

FIG. 9A is a graph showing a normalized refractive index distribution of a chirped grating whose refractive index changes stepwise along its longitudinal direction with a constant cycle of change in refractive index, whereas

FIG. 10A is a graph showing a normalized refractive index distribution of the chirped grating shown in FIG. 9A when heat is applied to a part thereof, whereas

DESCRIPTION OF THE PREFERRED EMBODIMENTS

In the following, embodiments of the optical I/O module and light-reflecting device according to the present invention will be explained with reference to FIGS. 2 to 5, 6A to 10B, and 11 to 19. Among these drawings, constituents identical or equivalent to each other will be referred to with numerals or letters identical to each other, without their overlapping explanations being repeated.

First Embodiment

Figure 1:
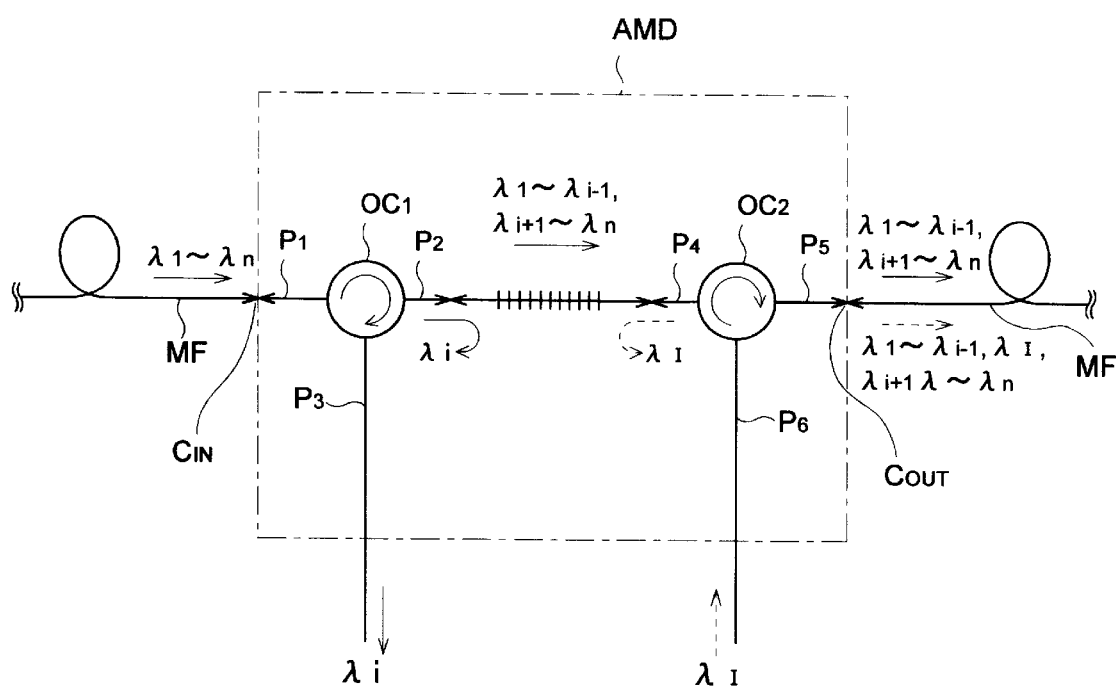
FIG. 1 is a view showing a configuration of a conventional optical I/O module (optical drop-add multiplexer)
Figure 2:
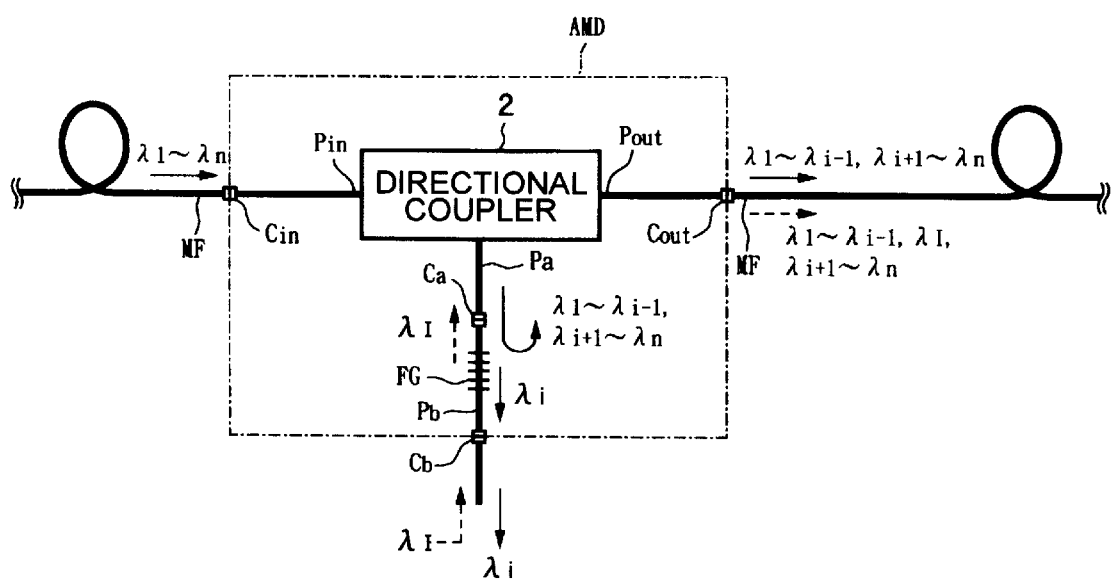
FIG. 2 is a block diagram showing a schematic configuration of a first embodiment of the optical I/O module according to the present invention.

The optical I/O module according to the first embodiment will be explained with reference to FIGS. 2 to 4. Referring to FIG. 2, an optical add-drop multiplexer ADM as the optical I/O module comprises a directional coupler 2 optically connected, via an input connector $C_{in}$ (included in an input terminal) and an output connector $C_{out}$ (included in an output terminal), to an optical transmission line (hereinafter referred to as optical fiber main line) MF or the like through which WDM signal light including a plurality of wavelength components $\lambda_1$ to $\lambda_n$ propagates; and a bidirectional optical reflector FG made of an optical fiber grating or the like having such a demultiplexing characteristic that it transmits therethrough a specific wavelength component $\lambda_i$ and reflects the rest of wavelength components $\lambda_1$ to $\lambda_{i-1}$, $\lambda_{i+1}$ to $\lambda_n$.

In practice, the optical fiber main line MF or the like is connected to an optical connector $C_{in}$ attached to a first port (input port) $P_{in}$ of the directional coupler 2 and an optical connector $C_{out}$ attached to a second port (output port) $P_{out}$ thereof. The optical reflector FG is connected to an optical connector $C_a$ attached to a third port (intermediate port) $P_a$; whereas a receiver, a transmitter, or the like is connected to an optical connector $C_b$ attached to a port $_{Pb}$ at the other end of the optical reflector FG.

The directional coupler 2 functions to guide the WDM signal light entering the port $P_{in}$ to the port $P_a$ and guide a given wavelength component entering the port $P_a$ to the port $P_{out}$. Usable as the directional coupler 2, for example, are an optical circulator 4, an optical fiber coupler 6, or the like, such as those shown in FIGS. 3 and 4, which guide the WDM signal light from the port $P_{in}$ to the port $P_a$ and guide the light entering the port $P_a$ to the port $P_{out}$.

In thus configured ADM, when WDM signal light including wavelength components $\lambda_1$ to $\lambda_n$ for a plurality of channels enters the port $P_{in}$ of the directional coupler 2, the WDM signal light is guided from the port $P_{in}$ to the optical reflector FG via the port $P_a$. The wavelength components $\lambda_1$ to $\lambda_{i-1}$, $\lambda_{i+1}$ to $\lambda_n$ are reflected by the optical reflector FG, and thus reflected components are emitted to the optical fiber main line MF by way of the port $P_{out}$ and optical connector $C_{out}$. Further, the wavelength component $\lambda_i$ is transmitted through the optical reflector FG and the is taken out from the port $P_b$ (thus dropping the wavelength component $\lambda_i$).

On the other hand, when a wavelength component $\lambda_I$ at the same wavelength as the wavelength component $\lambda_i$ is added to the port $P_b$ via the optical connector $C_b$, this wavelength component $\lambda_I$ passes through the optical reflector FG. Thus passed component, together with the reflected components, is guided to the port $P_{out}$ via the port $P_a$, thereby WDM signal light including the new wavelength component $\lambda_I$ (=$\lambda_i$) in addition to the wavelength components $\lambda_1$ to $\lambda_{i-1}$, $\lambda_{i+1}$ to $\lambda_n$ is emitted to the optical fiber main line MF.

Thus, this ADM can drop/add a desirable wavelength component from/to WDM signal light including a plurality of wavelength components $\lambda_1$ to $\lambda_n$. Further, by simply replacing the optical reflector FG having a structure (connector) detachable between the optical connectors $C_a$ and $C_b$ with another optical reflector having a different demultiplexing characteristic, a wavelength component to be dropped or added can easily be changed or supplemented. In particular, since the optical reflector FG is not serially connected to the optical fiber main line MF or the like, the above-mentioned wavelength component can be changed or supplemented without physically breaking the optical fiber main line MF or the like, thereby yielding a quite excellent expandability. Further, this simple configuration can greatly cut down the cost of manufacture.

Not only the optical fiber grating, but also gratings formed in various kinds of optical waveguides, dielectric multilayer film optical filters, and the like may be employed as the optical reflector FG.

For guiding the WDM signal light between the directional coupler 2 and the optical reflector FG, various kinds of optical waveguides such as optical fiber and planar optical waveguide can be used.

Also, in place of the optical reflector FG having such a demultiplexing characteristic as to transmit therethrough the specific wavelength component $\lambda_i$, an optical reflector having such a characteristic as to reflect all the wavelength components of the above-mentioned WDM signal light may be arranged, thereby allowing the WDM signal light entering the input port $P_{in}$, to be emitted to the output port $P_{out}$ as it is.

Second Embodiment

The optical I/O module according to the second embodiment will be explained with reference to FIGS. 5 and 6A to 10B. The second embodiment shown in FIG. 5 differs from the first embodiment shown in FIG. 2 in that it further comprises a light-reflecting device RD including a control mechanism (conversion system) CNT for variably controlling the demultiplexing characteristic of the optical reflector FG from the outside by applying heat, light at a specific wavelength, or mechanical stress thereto.

As the optical reflector FG, an optical fiber grating is used. The optical fiber grating comprises such a structure that it reflects all the wavelength components $\lambda_1$ to $\lambda_n$ in its static state with no control effected by the control mechanism CNT, whereas, when controlled by the control mechanism CNT, it changes its demultiplexing characteristic so as to transmit therethrough only a specific wavelength component $\lambda_i$ in the wavelength components $\lambda_1$ to $\lambda_n$ and reflect the rest of wavelength components $\lambda_1$ to $\lambda_{i-1}$, $\lambda_{i+1}$ to $\lambda_n$.

Specifically, the control mechanism CNT comprises a plurality of conversion units 8 (devices for applying heat or the like to their corresponding parts of the optical waveguide) arranged along the longitudinal direction of the optical waveguide formed with the optical reflector FG; and a driver 10 for individually driving these plurality of conversion units 8 according to a control signal $S_D$ from a control system CU.

FIGS. 6A to 10B show specific examples of such an optical fiber grating and their demultiplexing characteristics.

Figure 6A:
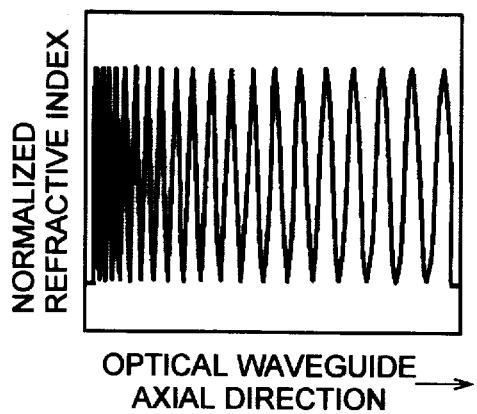
Figure 6B:
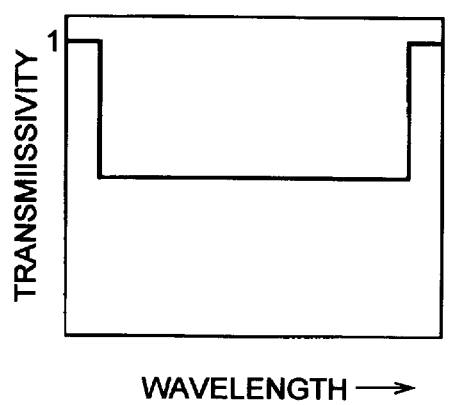
FIG. 6B is a graph showing a demultiplexing characteristic of the chirped grating shown in FIG. 6A.

The optical fiber grating shown in FIG. 6A is a chirped grating in which the cycle of change in refractive index in the core of the optical fiber gradually changes along its longitudinal direction (axial direction of the optical waveguide). As shown in FIG. 6B, it has such a demultiplexing characteristic as to reflect all of the wavelength components $\lambda_1$ to $\lambda_n$ in its static state.

Figure 7A:
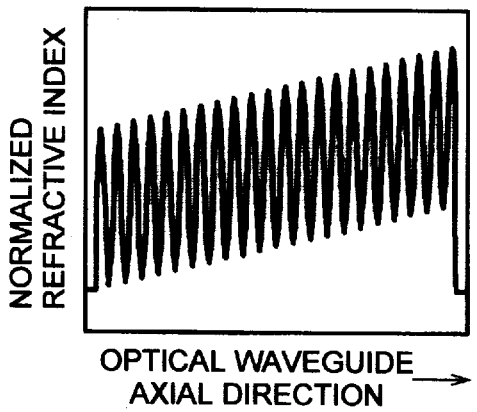
Figure 7B:
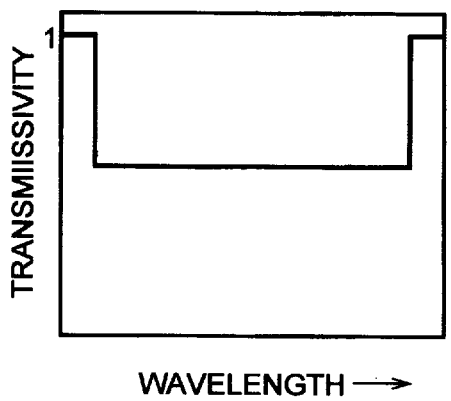
FIG. 7B is a graph showing a demultiplexing characteristic of the chirped grating shown in FIG. 7A.

The optical fiber grating shown in FIG. 7A is a chirped grating whose refractive index gradually changes with a constant cycle of change in refractive index along its longitudinal direction. As shown in FIG. 7B, it has such a demultiplexing characteristic as to reflect all of the wavelength components $\lambda_1$ to $\lambda_n$ in its static state.

Figure 9A:
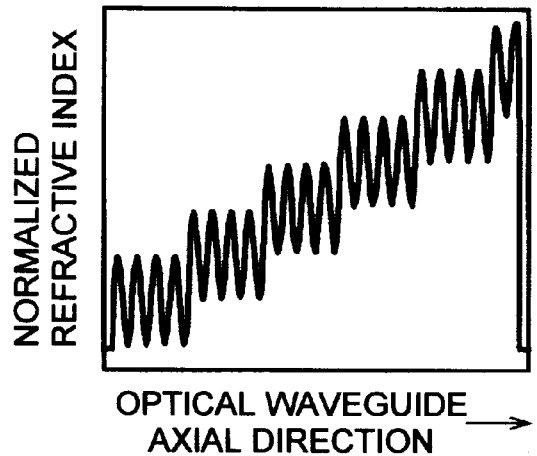
Figure 9B:
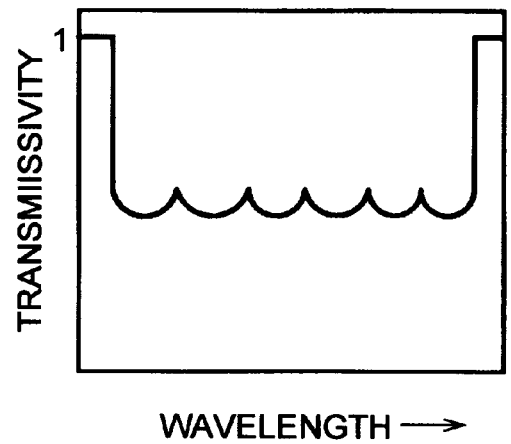
FIG. 9B is a graph showing a demultiplexing characteristic of the chirped grating shown in FIG. 9A.

The optical fiber grating shown in FIG. 9A is a chirped grating in which a plurality of gratings whose refractive indexes differ stepwise from each other, each having a constant cycle of change in refractive index along its longitudinal direction, form an array in a cascaded fashion. AS shown in FIG. 9B, it has such a demultiplexing characteristic as to reflect all of the wavelength components $\lambda_1$ to $\lambda_n$ An in its static state.

Figure 5:
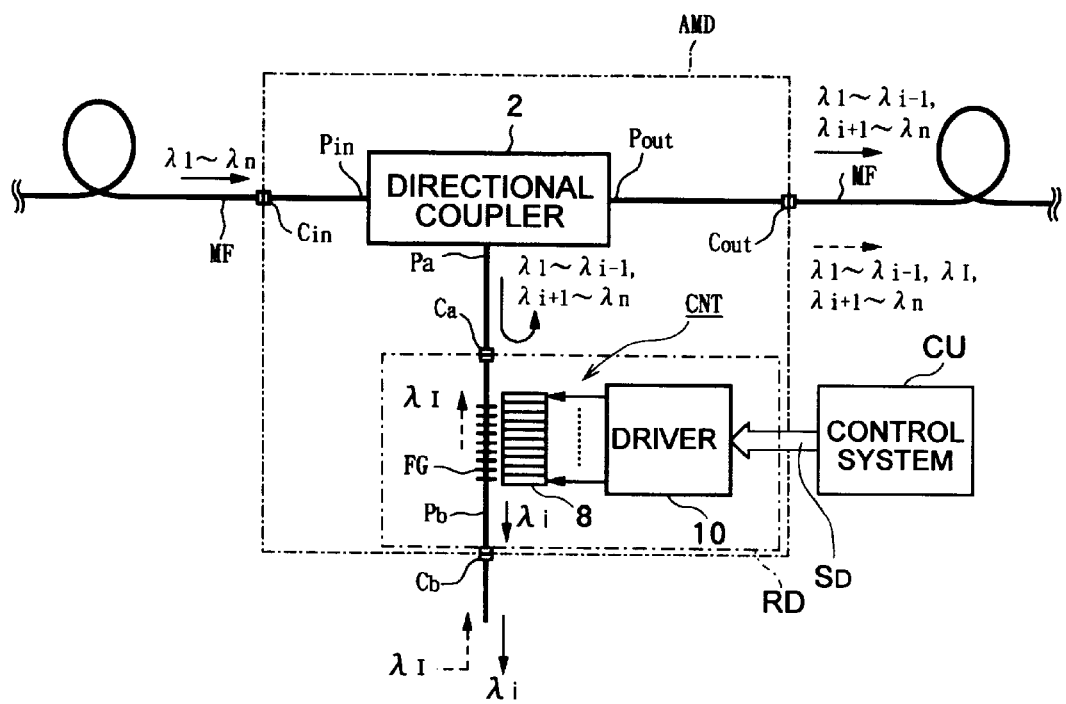
FIG. 5 is a block diagram showing a schematic configuration of a second embodiment of the optical I/O module according to the present invention.

In FIG. 5, the control mechanism CNT for thermally controlling the optical reflector FG comprises a plurality of heat source sections 8 (conversion units) arranged along the longitudinal direction of the chirped grating, each comprising a heating element such as a minute thermal head or Peltier device; and the driver 10 for supplying electric power to each heating element. When a microcomputer system (included in the control system CU) supplies to the driver 10 a control signal $S_D$ for designating the amount of electric power for each heating element, the heating (or cooling) of the designated heating element partly expands or constricts the chirped grating and changes the refractive index thereof, thereby partly modifying the refractive index distribution thereof. When the refractive index distribution is thus partly modified, the chirped grating having such a characteristic as to reflect all of the wavelength components $\lambda_1$ to $\lambda_n$ changes its demultiplexing characteristic so as to transmit therethrough only the wavelength component $\lambda_i$ designated by the control signal $S_D$ and reflect the rest of wavelength components $\lambda_1$ to $\lambda_n$.

Figure 8A:
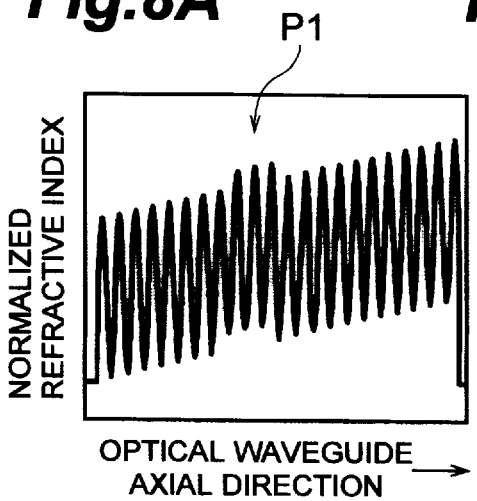
Figure 8B:
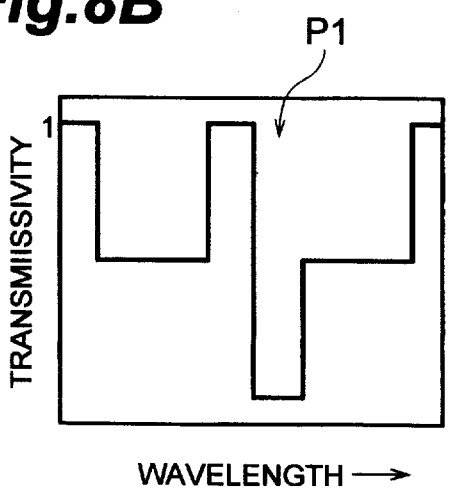
FIG. 8B is a graph showing a demultiplexing characteristic of the chirped grating shown in FIG. 8A.

According to the heated part P1 and the change in refractive index of this part P1 shown in FIG. 8A, the chirped grating shown in FIGS. 7A and 7B exhibits a demultiplexing characteristic for transmitting therethrough a specific wavelength as shown in FIG. 8B.

Figure 10A:
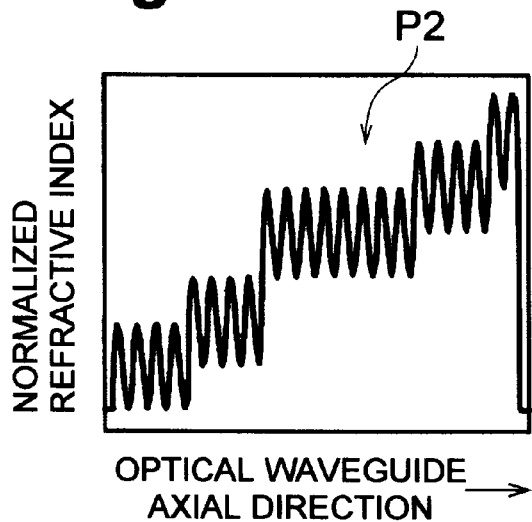
Figure 10B:
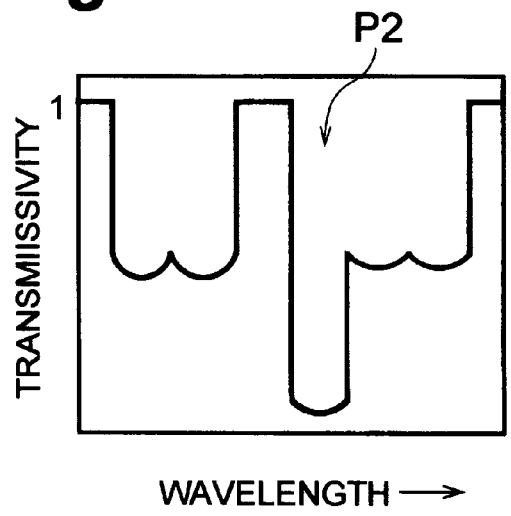
FIG. 10B is a graph showing a demultiplexing characteristic of the chirped grating shown in FIG. 10A.

According to the heated part P2 and the change in refractive index of this part P2 shown in FIG. 10A, the chirped grating shown in FIGS. 9A and 9B exhibits a demultiplexing characteristic for transmitting therethrough a specific wavelength as shown in FIG. 10B.

The control mechanism CNT for applying mechanical stress to the optical reflector FG uses, as its conversion units, piezoelectric elements or actuators which mechanically expand or constrict individual parts of the chirped grating, in place of the heat source sections 8. The piezoelectric elements or actuators mechanically expand or constrict their corresponding parts of the optical fiber grating, thereby changing the refractive index at the respective parts of the optical fiber grating, thus causing it to transmit therethrough a specific wavelength component.

In the control mechanism CNT for irradiating the optical reflector FG with light at a specific wavelength, each conversion unit 8 comprises a light source for irradiating its corresponding part of the chirped grating with laser light or the like, thereby changing the refractive index at the part that is thermally expanded or constricted by the laser light, thus allowing a given wavelength component to be transmitted therethrough.

Each of these control mechanisms CNT may control a plurality of parts of a chirped grating, so as to make it transmit a plurality of wavelength components therethrough.

The operation of the optical add-drop multiplexer ADM (included in an optical I/O module) having such a configuration will now be explained. When the optical reflector FG is not being controlled by the control mechanism CNT, if WDM signal light including a plurality of wavelength components $\lambda_1$ to $\lambda_n$ enters the port $P_{in}$ of the directional coupler 2, this WDM signal light will be guided from the port $P_a$ to the optical reflector FG, and then all the wavelength components $\lambda_1$ to $\lambda_n$ will be reflected by the optical reflector FG, so as to be emitted from the port $P_a$ to the port $P_{out}$.

When the optical reflector FG is being controlled by the control mechanism CNT, by contrast, the chirped grating exhibits such a demultiplexing characteristic as to transmit therethrough the wavelength component $\lambda_i$ designated by the control signal $S_D$. As a consequence, the optical reflector FG reflects, of the wavelength components $\lambda_1$ to $\lambda_n$ entering from the port $P_a$ of the directional coupler 2, the wavelength components $\lambda_1$ to $\lambda_{i-1}$, $\lambda_{i+1}$ to $\lambda_n$ so as to emit them from the port $P_a$ to the port $P_{out}$. On the other hand, the optical reflector FG transmits the wavelength component $\lambda_i$ therethrough, and thus transmitted wavelength component $\lambda_i$ propagates to the port $P_b$.

Further, while the optical reflector FG is under the control of the control mechanism CNT, if a wavelength component $\lambda_I$ at the same wavelength as the wavelength component $\lambda_i$ is added to the port $P_b$ via the optical connector $C_b$, this wavelength component $\lambda_I$ will be transmitted through the optical reflector FG, so as to propagate to the port $P_{out}$. Consequently, WDM signal light including the wavelength component $\lambda_I$ in addition to the wavelength components $\lambda_1$ to $\lambda_{i-1}$, $\lambda_{i+1}$ to $\lambda_n$ will be emitted to the optical fiber main line MF via the output connector $C_{out}$.

Thus, in the light-reflecting device RD employed in the ADM, the demultiplexing characteristic of the optical reflector FG can variably be controlled by the control mechanism CNT, thereby a desirable wavelength component can easily be dropped or added without requiring the optical reflector FG to be replaced and so forth. In particular, since it can change the demultiplexing characteristic of the optical reflector FG by simply instructing the control mechanism CNT of a desirable transmission wavelength, it has a quite excellent expandability such as to be able to constitute a communication network equipped with functions of remote system, automatic control system, and the like, for example.

Third Embodiment

The optical I/O module according to the third embodiment will be explained with reference to FIGS. 11 to 15.

Figure 3:
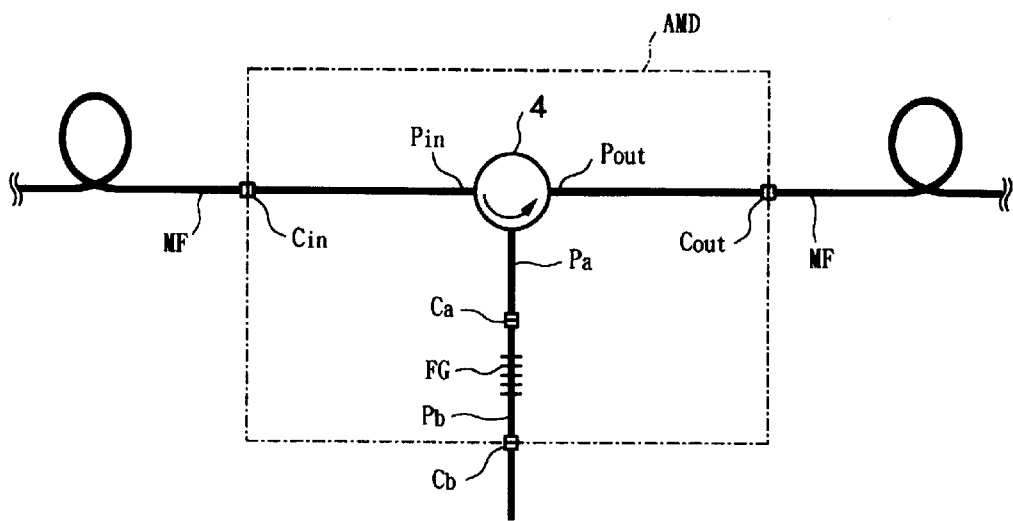
FIG. 3 is a view showing a configuration of a first specific example of the optical I/O module according to the first embodiment shown in FIG. 2.
Figure 11:
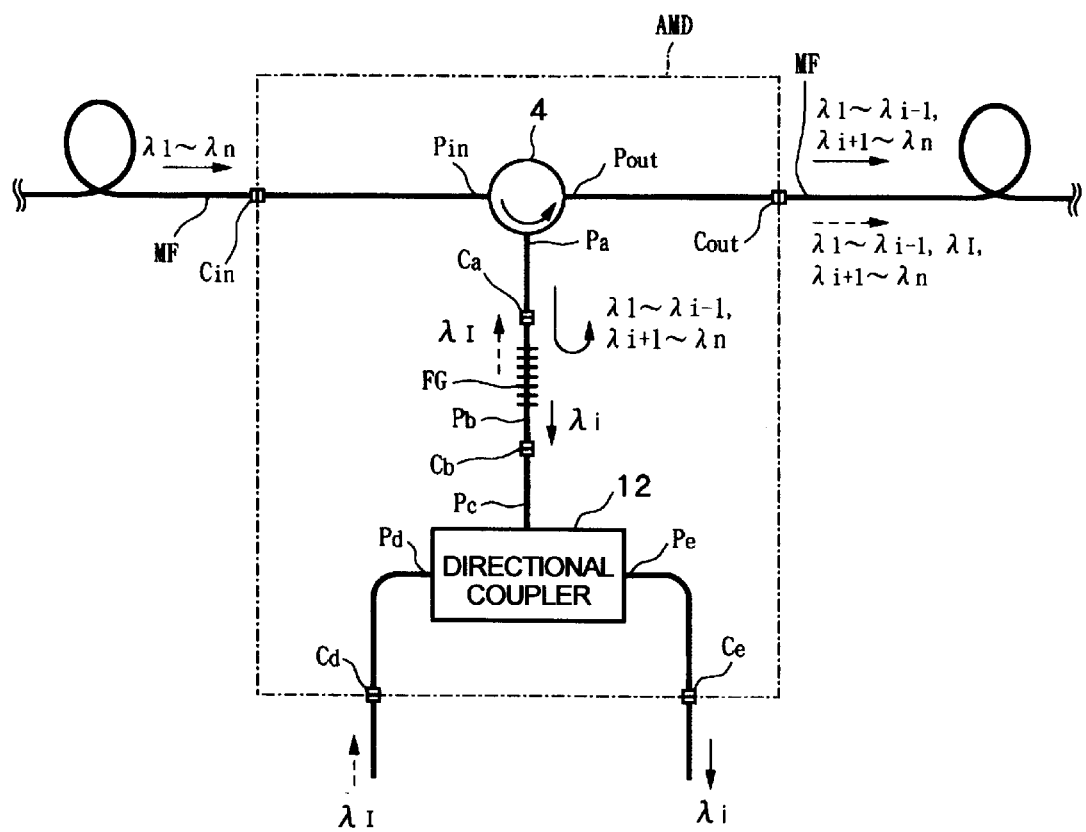
FIG. 11 is a block diagram showing a schematic configuration of a third embodiment of the optical I/O module according to the present invention.

The ADM according to the third embodiment shown in FIG. 11 comprises, as with the ADM of the first embodiment shown in FIG. 3, an optical circulator 4 optically connected to an optical fiber main line MF or the like via an input connector $C_{in}$ and an output connector $C_{out}$, and an optical reflector FG. The ADM according to the third embodiment further comprises another directional coupler 12 having a port $P_c$ optically connected to a port $P_a$ via the optical reflector FG.

The directional coupler 12 functions to guide a wavelength component $\lambda_I$ entering an adding port $P_d$ to the port $P_c$ and guide a wavelength component $\lambda_i$ entering the port $P_c$ (wavelength component passing through the optical reflector FG) to a dropping port $P_e$. The ports $P_d$, $P_e$ are equipped with optical connectors $C_d$, $C_e$ for connecting with a receiver, a transmitter, and the like.

Figure 12:
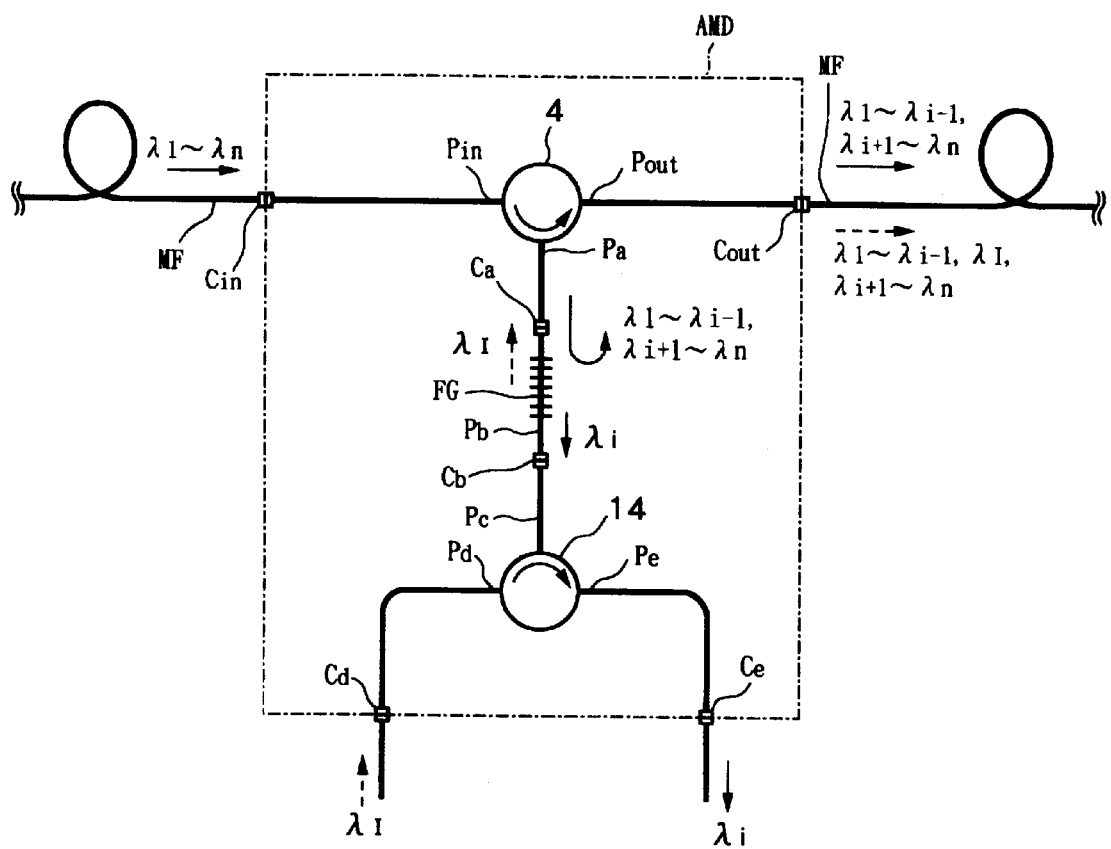
FIG. 12 is a view showing a configuration of a first specific example of the optical I/O module according to the third embodiment shown in FIG. 11.
Figure 13:
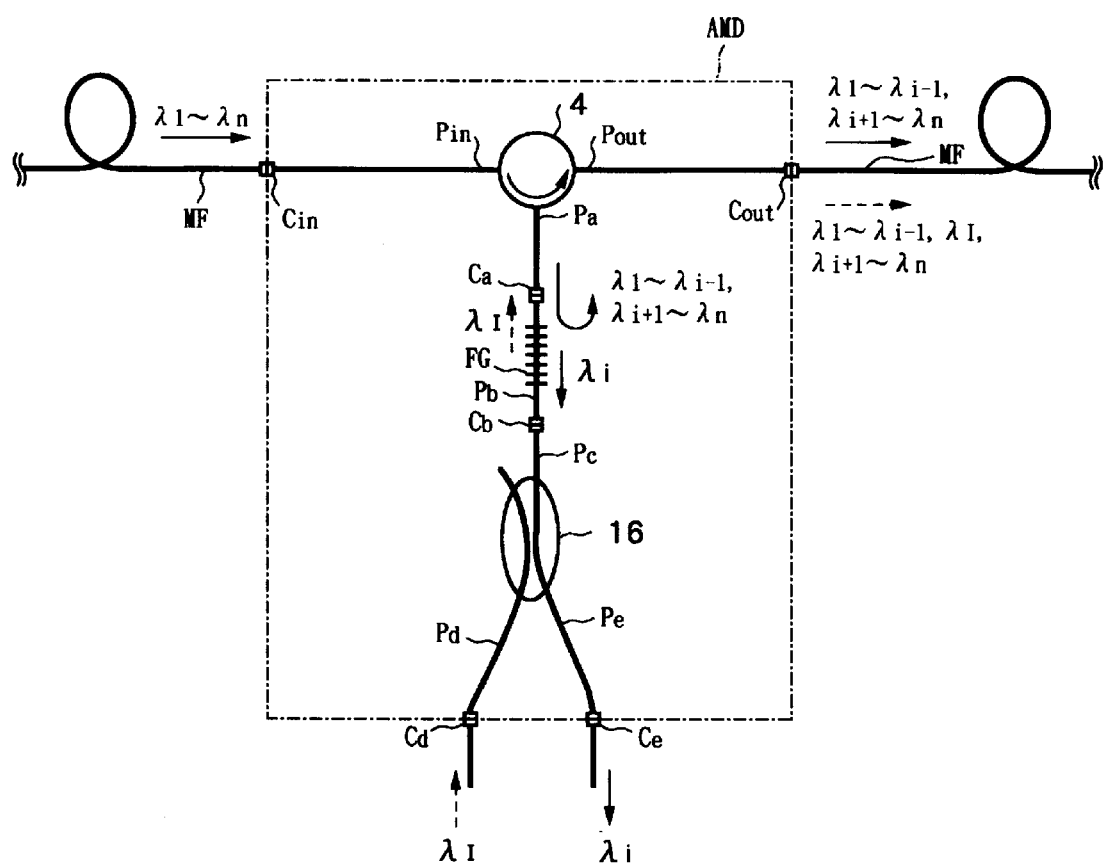
FIG. 13 is a view showing a configuration of a second specific example of the optical I/O module according to the third embodiment shown in FIG. 11.

Usable as the directional coupler 12, for example, are an optical circulator 14, an optical fiber coupler 16, and the like, such as those shown in FIGS. 12 and 13, which guide the wavelength component entering the adding port $P_d$ to the port $P_c$ and guide the wavelength component entering the port $P_c$ to the dropping port $P_e$.

In thus configured ADM, when WDM signal light including a plurality of wavelength components $\lambda_1$ to $\lambda_n$ enters a port $P_{in}$ of the optical circulator 4 via the connector $C_{in}$, this WDM signal light propagates to the optical reflector FG via the port $P_a$. Wavelength components $\lambda_1$ to $\lambda_{i-1}$, $\lambda_{i+1}$ to $\lambda_n$ are reflected by the optical reflector FG having such a demultiplexing characteristic as to transmit therethrough a specific wavelength component $\lambda_i$. These reflected wavelength components propagate to the port $P_{out}$ via the port $P_a$. The wavelength component $\lambda_i$ transmitted through the optical reflector FG propagates to the directional coupler 12, so as to be guided to the dropping port $P_e$.

When a wavelength component $\lambda_I$ at the same wavelength as the wavelength component $\lambda_i$ is added to the adding port $P_d$ via the optical connector $C_d$, it propagates to the optical reflector FG via the port $P_c$ of the directional coupler 12. This wavelength component $\lambda_I$ (=$\lambda_i$) passes through the optical reflector FG as it is. This wavelength component $\lambda_I$ further propagates to the port $P_{out}$ via the port $P_a$, thereby being emitted, together with the wavelength components $\lambda_1$ to $\lambda_{i-1}$, $\lambda_{i+1}$ to $\lambda_n$ as the WDM signal light to be outputted to the optical fiber main line MF.

Thus, the third embodiment can provide an optical add-drop multiplexer, in a simple configuration, comprising the dropping port $P_e$ for dropping a desired wavelength component and the adding port $P_d$ for adding a desired wavelength component. Also, by simply replacing the detachable optical reflector FG connected between the connectors $C_a$ and $C_b$ with another optical reflector having a different demultiplexing characteristic, another desirable wavelength component can be dropped or added. The light-reflecting device RD including the control mechanism CNT and optical reflector FG shown in FIG. 5 may also be employed.

Figure 14:
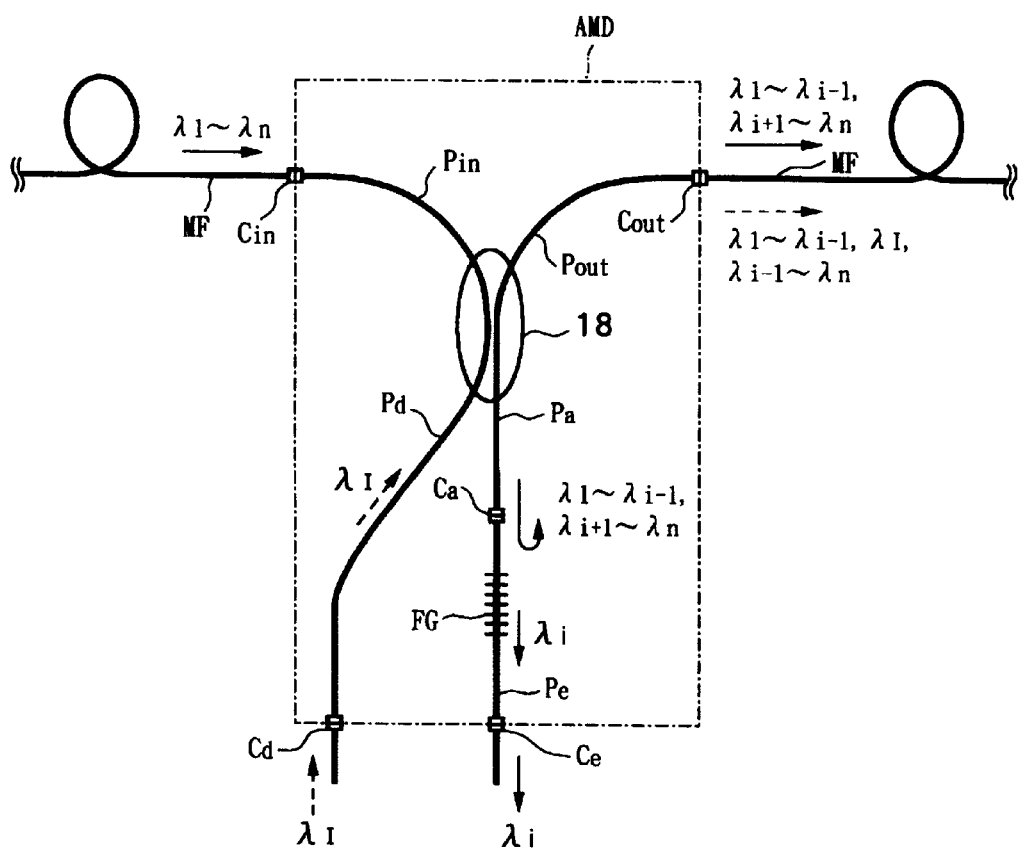
FIG. 14 is a view showing a configuration of a first modified example of the optical I/O module according to the third embodiment shown in FIG. 11.

FIG. 14 shows a first modified example of the ADM according to the third embodiment realizing a simpler configuration. This ADM comprises an optical fiber coupler 18, and an optical reflector FG such as optical fiber grating optically connected to the port $P_a$ of the optical fiber coupler 18 and the dropping port $P_e$. In this optical fiber coupler 18, the port $P_d$ is a port for adding the wavelength component $\lambda_I$, whereas the ports $P_{in}$ and $P_{out}$ optically connected to the optical fiber main line MF of the communication network via their respective connectors $C_{in}$, $C_{out}$ constitute a part of the transmission line.

Thus configured ADM guides WDM signal light including a plurality of wavelength components $\lambda_1$ to $\lambda_n$ entering the port $P_{in}$ to the optical reflector FG via the coupling portion of the optical fiber coupler 18, and transmits a specific wavelength component $\lambda_i$ through the optical reflector FG, so as drop it to the dropping port $P_e$. The optical reflector FG reflects the rest of wavelength components so as to guide them to the port $P_{out}$ by way of the optical fiber coupler 18 again.

When a wavelength component $\lambda_I$ at the same wavelength as the wavelength component $\lambda_i$ is added to the adding port $P_d$ via the optical connector $C_d$, it propagates to the port POut via the optical fiber coupler 18, thereby being emitted to the optical fiber main line MF via the connector $C_{out}$ as WDM signal light together with the wavelength components $\lambda_1$ to $\lambda_{i-1}$, $\lambda_{i+1}$ to $\lambda_n$.

Thus, the first modified example of the third embodiment can provide an optical I/O module in a very simple configuration which is capable of dropping or adding a desirable wavelength component.

Figure 15:
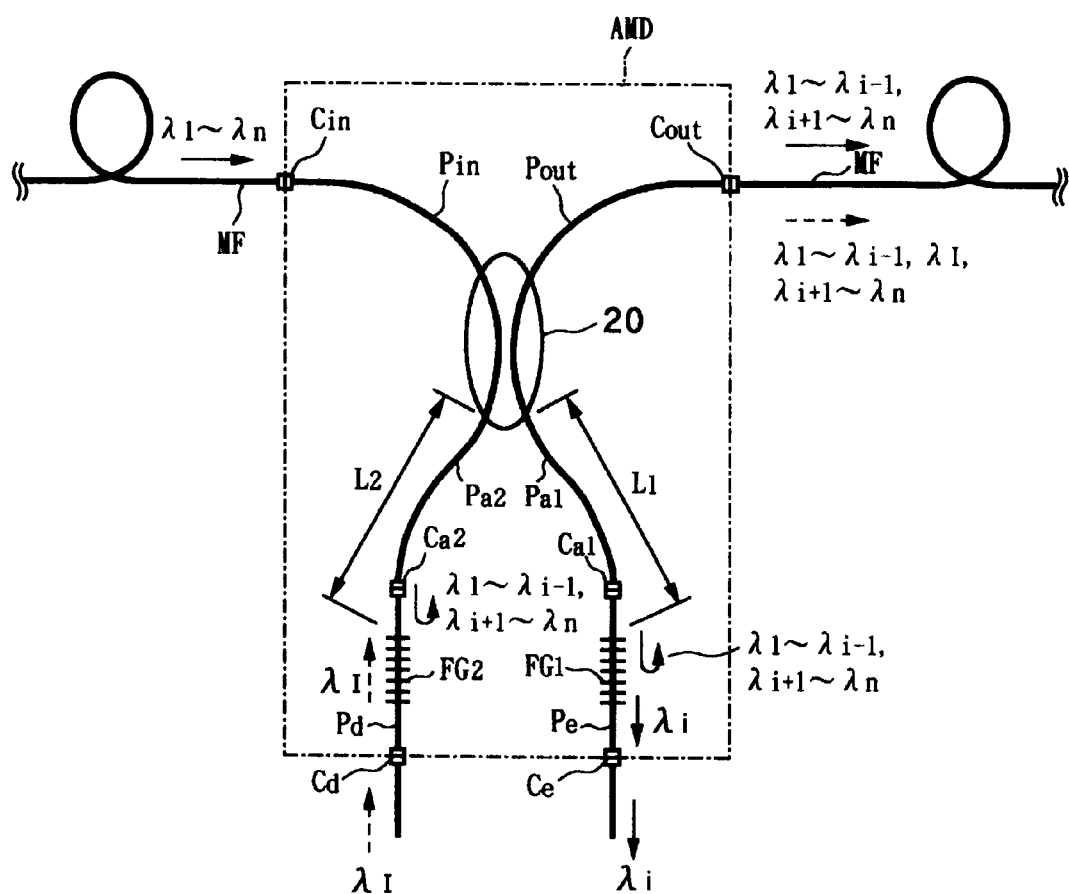
FIG. 15 is a view showing a configuration of a second modified example of the optical I/O module according to the third embodiment shown in FIG. 11.

FIG. 15 shows a second modified example of the ADM according to the third embodiment. This ADM comprises an optical fiber coupler 20; an optical reflector FG1, such as an optical fiber grating, optically connected to an intermediate port $P_{a1}$ of the optical fiber coupler 20 and a dropping port $P_e$; and an optical reflector FG2, having a demultiplexing characteristic identical to that of the optical reflector FG1, optically connected to another intermediate port $P_{a2}$ of the optical fiber coupler 20 and an adding port $P_d$. As a consequence, the optical reflector FG1 is positioned between a connector $C_{a1}$ and a connector $C_e$, whereas the optical reflector FG2 is positioned between a connector $Ca_2$ and a connector $C_d$. Further, the ratio $L_1/L_2$ of the optical path length $L_1$ between the optical coupling portion of the optical fiber coupler 20 and the optical reflector FG1 to the optical path length $L_2$ between the optical coupling portion of the optical fiber coupler 20 and the optical reflector FG2 is set to an integer.

In thus configured ADM, when WDM signal light having a plurality of wavelength components $\lambda_1$ to $\lambda_n$ enters the port $P_{in}$, it propagates to the optical reflectors FG1 and FG2 via the optical fiber coupler 20.

Here, the optical fiber coupler 20 has such a characteristic as to change the phase of light propagating between the diagonally positioned ports $P_{in}$ and $P_a$ or ports $P_{out}$ and $P_d$ by $\pi/2$, but not to change the phase of light propagating between the ports $P_{in}$ and $P_d$ or ports $P_{out}$ and $P_e$ that are not positioned diagonally. As a consequence, the phase of the wavelength components $\lambda_1$ to $\lambda_n$ arriving at the optical reflector FG1 changes by $\pi/2$, whereas the phase of the wavelength components $\lambda_1$ to $\lambda_n$ arriving at the optical reflector FG2 does not change.

Thus, the optical reflector FG1 transmits therethrough, of the wavelength components $\lambda_1$ to $\lambda_n$ reaching there, a wavelength component $\lambda_i$, so as to drop it to the dropping port $P_e$. The wavelength components $\lambda_1$ to $\lambda_{i-1}$, $\lambda_{i+1}$ to $\lambda_n$ are reflected by the optical reflector FG1, so as to be guided to the port $P_{out}$ by way of the optical fiber coupler 20 again. Similarly, the optical reflector FG2 transmits therethrough the wavelength component $\lambda_i$ reaching there from the optical fiber coupler 20, and reflects the wavelength components $\lambda_1$ to $\lambda_{i-1}$, $\lambda_{i+1}$ to $\lambda_n$ so as to guide them to the port $P_{out}$ by way of the optical fiber coupler 20 again.

Here, though the wavelength components $\lambda_1$ to $\lambda_{i-1}$, $\lambda_{i+1}$ to $\lambda_n$ reflected by the optical reflector FG1 so as to be directed toward the port $P_{out}$ have already changed their phase by $\pi/2$ as mentioned above, they would not further change the phase when passing through the optical fiber coupler 20 again. on the other hand, the wavelength components $\lambda_1$ to $\lambda_{i-1}$, $\lambda_{i+1}$ to $\lambda_n$ reflected by the optical reflector FG1 so as to propagate toward the port $P_{in}$ have already changed their phase by $\pi/2$ as mentioned above, and further change their phase by $\pi/2$ when passing through the optical fiber coupler 20 again, thereby generating a phase change of $\pi$ in total. Also, the wavelength components $\lambda_1$ to $\lambda_{i-1}$, $\lambda_{i+1}$ to $\lambda_n$ reflected by the optical reflector FG2 so as to be directed toward the port $P_{out}$ change their phase by $\pi/2$ for the first time when passing through the optical fiber coupler 20 again. On the other hand, the wavelength components $\lambda_1$ to $\lambda_{i-1}$, $\lambda_{i+1}$ to $\lambda_n$ reflected by the optical reflector FG2 so as to be directed toward the port $P_{in}$ would not change their phase. Further, the ratio $L_1/L_2$ between the optical path lengths $L_1$ and $L_2$ is set to an integer.

As a consequence, the two sets of signal light (each including the wavelength components $\lambda_1$ to $\lambda_{i-1}$, $\lambda_{i+1}$ to $\lambda_n$ reflected by the optical reflectors FG1, FG2 so as to be directed toward the port $P_{in}$ have phases opposite to each other, so as to cancel each other and disappear, thus substantially failing to return to the port $P_{in}$. By contrast, the two sets of signal light (each including the wavelength components $\lambda_1$ to $\lambda_{i-1}$, $\lambda_{i+1}$ to $\lambda_n$ reflected by the optical reflectors FG1, FG2 so as to be directed toward the port $P_{out}$ have phases identical to each other, so as to be combined together.

Thus, the wavelength components $\lambda_1$ to $\lambda_{i-1}$, $\lambda_{i+1}$ to $\lambda_n$ yielding less attenuation in light intensity can be obtained from the port $P_{out}$. A wavelength component $\lambda_I$ at the same wavelength as the wavelength component $\lambda_i$ added to the adding port $P_d$ via the optical connector $C_d$ passes through the optical reflector FG2, so as to be guided to the port $P_{out}$ via the optical fiber coupler 20. Consequently, this wavelength component $\lambda_I$ ($=\lambda_i$) is directed toward the port $P_{out}$, together with the wavelength components $\lambda_1$ to $\lambda_{i-1}$, $\lambda_{i+1}$ to $\lambda_n$ as WDM signal light.

Thus, in a very simple configuration, this ADM can drop and add a desirable wavelength component. In particular, it would yield excellent results when used for constructing a high-quality optical communication network and the like, since WDM signal light entering the port $P_{in}$ can propagates to the port $P_{out}$ without being attenuated therein.

Fourth Embodiment

Figure 16:
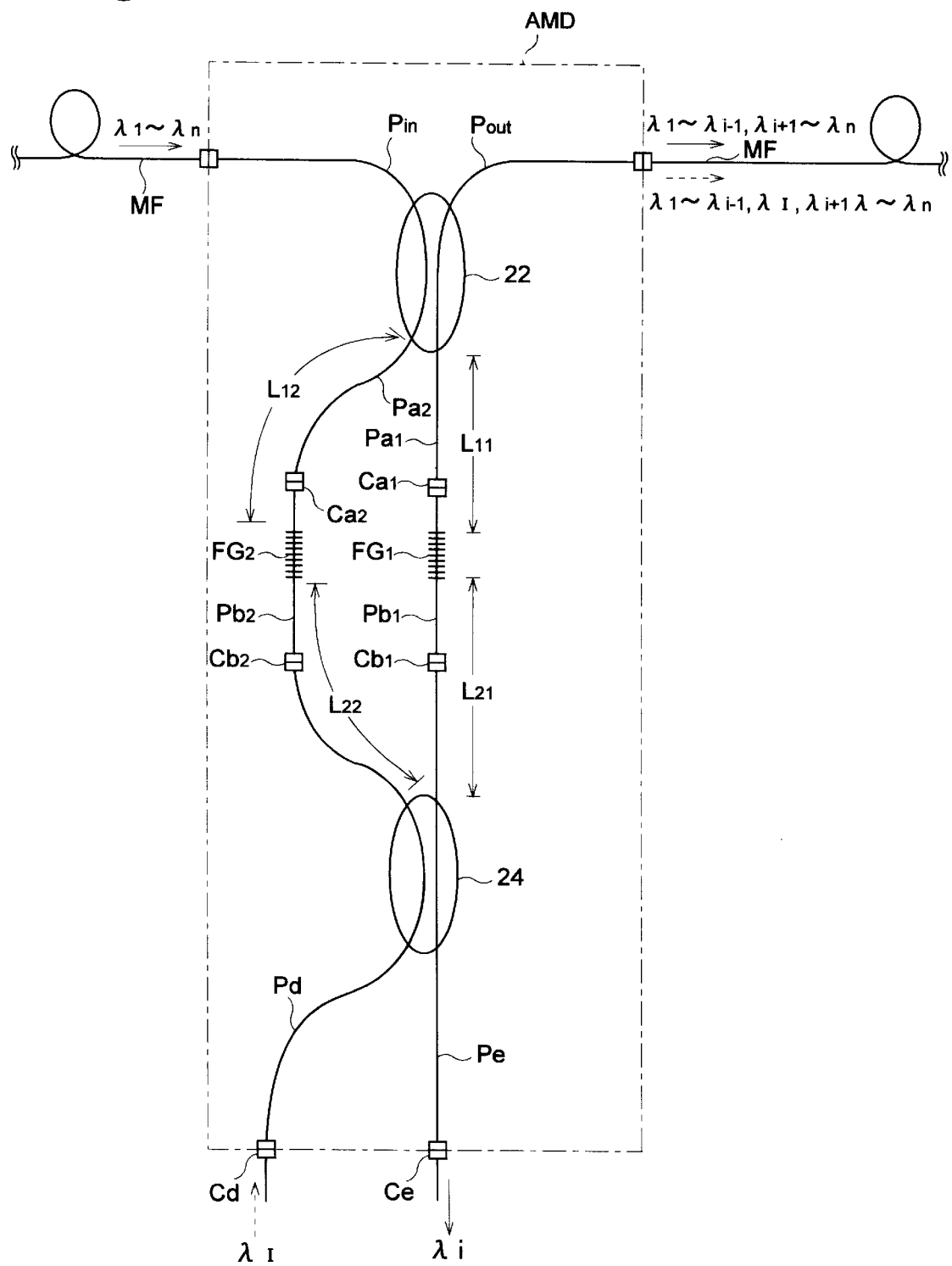
FIG. 16 is a view showing a schematic configuration of a fourth embodiment of the optical I/O module according to the present invention.

The optical I/O module according to the fourth embodiment will be explained with reference to FIG. 16.

In the ADM of the fourth embodiment, between two optical fiber couplers 22, 24, optical reflectors FG1, FG2 are arranged between intermediate ports $P_{a1}$, $P_{b1}$ and between intermediate ports $P_{a2}$, $P_{b2}$, respectively. Employed as these optical reflectors FG1, FG2 are optical fiber gratings or the like having demultiplexing characteristics identical to each other, each having such a demultiplexing characteristic that, when WDM signal light including a plurality of wavelength components $\lambda_1$ to $\lambda_n$ is incident thereon, a specific wavelength component $\lambda_i$ thereof is transmitted therethrough, and the rest of wavelength components $\lambda_1$ to $\lambda_{i-1}$, $\lambda_{i+1}$ to $\lambda_n$ are reflected thereby.

Further, the ratio $L_{11}/L_{12}$ of the optical path length $L_{11}$ between the optical coupling portion of the optical fiber coupler 22 and the optical reflector FG1 to the optical path length $L_{12}$ between the optical coupling portion of the optical fiber coupler 22 and the optical reflector FG2 is set to an integer. Similarly, the ratio $L_{21}/L_{22}$ oftheoptical path length $L_{21}$ between the optical coupling portion of the optical fiber coupler 24 and the optical reflector FG1 to the optical path length $L_{22}$ between the optical coupling portion of the optical fiber coupler 24 and the optical reflector FG2 is set to an integer.

The operation of thus configured ADM will now be explained.

When WDM signal including a plurality of wavelength components $\lambda_1$ to $\lambda_n$ enters the optical fiber coupler 22 via the port $P_{in}$, WDM signal which has changed its phase by $\pi/2$ in the optical fiber coupler 22 propagates to the optical reflector FG1, whereas WDM signal light with no phase change propagates to the optical reflector FG2.

Both of the optical reflectors FG1, FG2 transmit therethrough the wavelength component $\lambda_i$ so as to guide it to the optical fiber coupler 24, and reflect the rest of wavelength components $\lambda_1$ to $\lambda_{i-1}$, $\lambda_{i+1}$ to $\lambda_n$ toward the optical fiber coupler 22. The optical fiber coupler 22 emits thus reflected wavelength components $\lambda_1$ to $\lambda_{i-1}$, $\lambda_{i+1}$ to $\lambda_n$ to the port $P_{out}$.

Here, the ratio $L_{11/L12}$ between the optical path lengths $L_{11}$ and $L_{12}$ is set to an integer. The optical fiber coupler 22 has such a characteristic as to change the phase of light propagating between the diagonally positioned port $P_{in}$ and intermediate port $P_{a1}$ or port $P_{out}$ and intermediate port $P_{a2}$ by $\pi/2$, but not to change the phase of light propagating between the ports $P_{in}$ and $P_{a2}$ or ports $P_{out}$ and $P_{a1}$ that are not positioned diagonally.

As a consequence, the two set of signal light, each including wavelength components $\lambda_1$ to $\lambda_{i-1}$, $\lambda_{i+1}$ to $\lambda_n$ reflected by the optical reflectors FG1, FG2 so as to propagate to the port $P_{in}$ of the optical fiber coupler 22 have phases opposite to each other so as to cancel each other and disappear, thus substantially failing to return to the port $P_{in}$. By contrast, the two sets of signal light (each including the wavelength components $\lambda_1$ to $\lambda_{i-1}$, $\lambda_{i+1}$ to $\lambda_n$) reflected by the optical reflectors FG1, FG2 so as to be directed toward the port $P_{out}$ of the optical fiber coupler 22 have phases identical to each other, so as to be combined together. Thus, the wavelength components $\lambda_1$ to $\lambda_{i-1}$, $\lambda_{i+1}$ to $\lambda_n$ yielding less attenuation in light intensity can be obtained from the port $P_{out}$.

The wavelength component $\lambda_i$ transmitted through the optical reflectors FG1, FG2 is directed toward the ports $P_d$, $P_e$ via the optical fiber coupler 24.

Here, as with the optical fiber coupler 22, the optical fiber coupler 24 has such a characteristic as to change the phase of light propagating between the diagonally positioned ports $P_{b1}$ and $P_d$ or ports $P_{b2}$ and $P_e$ by $\pi/2$, but not to change the phase of light propagating between the ports $P_{b1}$ and $P_e$ or ports $P_{b2}$ and $P_d$ that are not positioned diagonally. Further, the ratio $L_{21}/L_{22}$ between the optical path lengths $L_{21}$ and $L_{22}$ is set to an integer.

As a consequence, the wavelength component A directed from the optical reflector FG1 toward the adding port $P_d$ and the wavelength component $\lambda_i$ directed from the optical reflector FG2 toward the adding port $P_d$ have phases opposite to each other so as to cancel each other and disappear, thus substantially failing to return to the port $P_d$.

On the other hand, the wavelength component $\lambda_i$ propagating from the optical reflector FG1 toward the dropping port $P_e$ and the wavelength component $\lambda_i$ propagating from the optical reflector FG2 toward the dropping port $P_e$ have phases identical to each other. As a consequence, these wavelength components $\lambda_i$ are combined together, so as to be dropped to the dropping port $P_e$.

Then, when a wavelength component $\lambda_I$ at the same wavelength as the wavelength component $\lambda_i$ is added to the adding port $P_d$ via the optical connector $C_d$, this wavelength component $\lambda_I$ ($=\lambda_i$) passes through the optical fiber coupler 24 so as to be directed to the optical reflectors FG1, FG2, and further passes through the optical reflectors FG1, FG2 so as to be directed through the optical fiber coupler 22 to its port $P_{out}$.

Here, due to the above-mentioned characteristics of the optical fiber couplers 22, 24 and integral relationships between optical lengths $L_{11}$ and $L_{12}$ and between optical lengths $L_{21}$ and $L_{21}$, the respective wavelength components $\lambda_I$ passing through the optical reflectors FG1, FG2 so as to be directed toward the port $P_{in}$ of the optical fiber coupler 22 attain phases opposite to each other so as to cancel each other, thus substantially failing to propagate to the port $P_{in}$. On the other hand, the respective wavelength components $\lambda_I$ passing through the optical reflectors FG1, FG2 so as to be directed toward the port $P_{out}$ of the optical fiber coupler 22 attain phases identical to each other so as to be combined together. As a consequence, when a desirable wavelength components $\lambda_I$ is added to the adding port $P_d$, this wavelength component $\lambda_I$ is directed only toward the port $P_{out}$ of the optical fiber coupler 22, thereby WDM signal light including the wavelength component $\lambda_f$ in addition to the wavelength components $\lambda_1$ to $\lambda_{i-1}$, $\lambda_{i+1}$ to $\lambda_n$ is emitted to the optical fiber main line MF.

Thus, in accordance with the fourth embodiment, the WDM signal light entering the port $P_{in}$ is emitted to the port $P_{out}$ without propagating in the opposite direction, and the added wavelength component is emitted to the port $P_{out}$ without being directed to the port $P_{in}$, thereby interference and the like can remarkably be suppressed.

When optical reflectors transmitting therethrough a plurality of wavelength components and reflecting the rest of wavelength components are employed as the optical reflectors FG1, FG2, a plurality of wavelength components can be dropped and added.

When the optical reflectors FG1, FG2 are made detachable (the optical reflector FG1 is provided with connectors $C_{a1}$, $C_{b1}$, whereas the optical reflector FG2 is provided with connectors $C_{a2}$, $C_{b2}$), the wavelength components to be dropped or added can easily be changed. Also, the light-reflecting device including the optical reflectors FG1, FG2 may use the chirped grating explained in the second embodiment, so as to variably control their demultiplexing characteristics by the control mechanism CNT.

When total reflection type optical reflectors are employed, the WDM signal light entering the input port $P_{in}$ would be emitted to the output port $P_{out}$ as it is.

Fifth Embodiment

Figure 17:
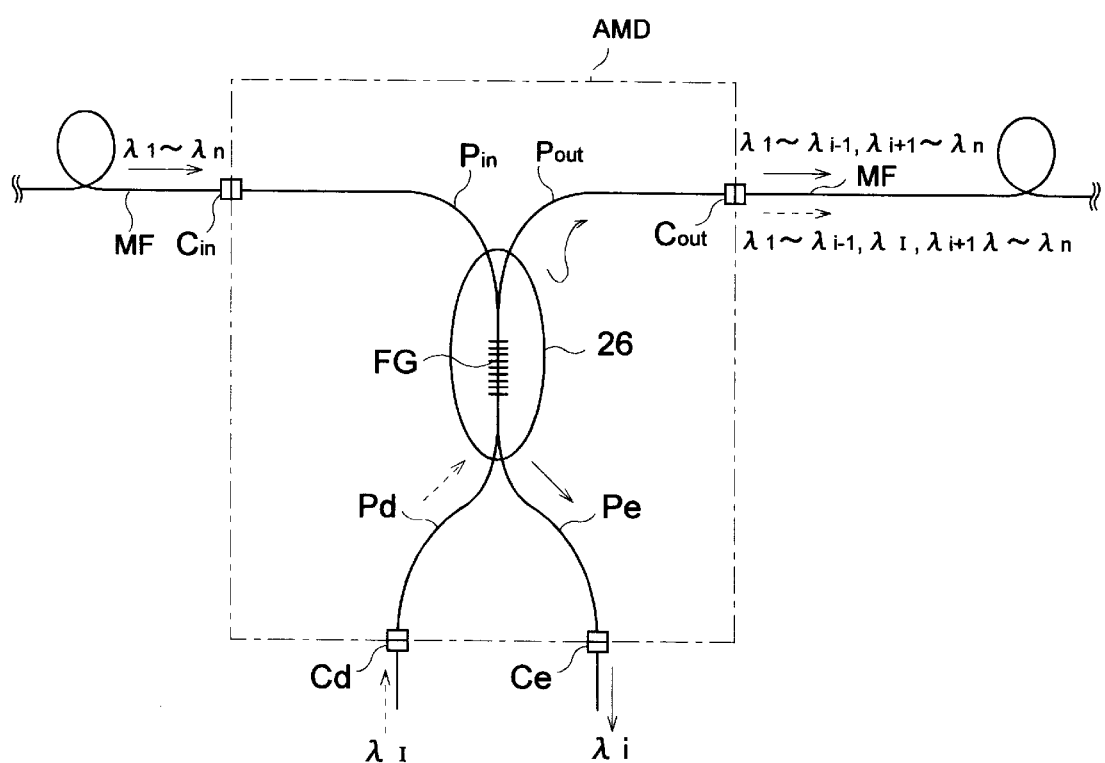
FIG. 17 is a view showing a schematic configuration of a fifth embodiment of the optical I/O module according to the present invention.

The optical I/O module according to the fifth embodiment will be explained with reference to FIG. 17.

The ADM according to the fifth embodiment comprises an optical coupler 26 in which a pair of single-mode optical fibers are partly fused together, the optical coupling portion produced by this fusing being integrally formed with a grating, thus yielding an optical reflector FG integrated therewith. The grating has such a demultiplexing characteristic that, when WDM signal light including a plurality of wavelength components $\lambda_1$ to $\lambda_n$ is incident thereon, a specific wavelength component $\lambda_i$ thereof is transmitted therethrough, and the rest of wavelength components $\lambda_1$ to $\lambda_{i-1}$, $\lambda_{i+1}$ to $\lambda_n$ are reflected thereby.

In thus configured ADM, when WDM signal light including a plurality of wavelength components $\lambda_1$ to $\lambda_n$ enters a port $P_{in}$, a specific wavelength component $\lambda_i$ thereof passes through the optical reflector FG so as to be dropped to a dropping port $P_e$, whereas the rest of wavelength components $\lambda_1$ to $\lambda_{i-1}$, $\lambda_{i+1}$ to $\lambda_n$ are reflected by the optical reflector FG so as to be emitted to the port $P_{out}$.

When a wavelength component $\lambda_f$ at the same wavelength as the wavelength component $\lambda_i$ is added to an adding port $P_d$ this wavelength component $\lambda_f$ (=$\lambda_i$) passes through the optical reflector FG so as to be directed to the port $P_{out}$ as WDM signal light together with the wavelength components $\lambda_1$ to $\lambda_{i-1}$, $\lambda_{i+1}$ to $\lambda_n$.

Thus, the fifth embodiment can provide an optical add-drop multiplexer in a very simple configuration at a low cost.

When the optical coupling portion is integrally formed with a total reflection type grating, the WDM signal light entering the input port $P_{in}$ can be emitted to the output port $P_{out}$ as it is.

Sixth Embodiment

The optical I/O module according to the sixth embodiment will be explained with reference to FIGS. 18 and 19.

Figure 18:
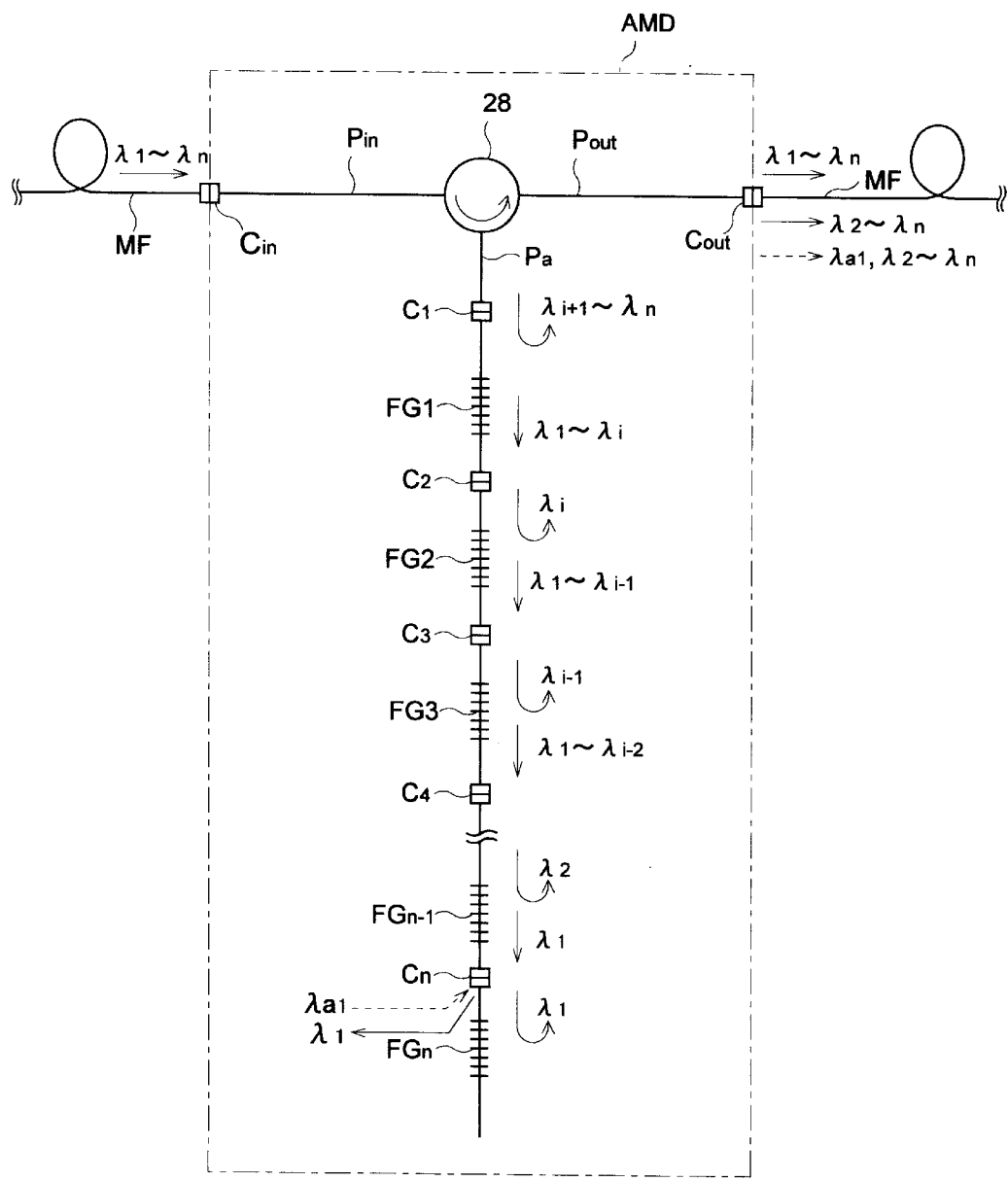
FIG. 18 is a view showing a schematic configuration of a sixth embodiment of the optical I/O module according to the present invention.

The ADM shown in FIG. 18 has such a configuration that a plurality of optical reflectors $FG_1$ to $FG_n$ each comprising an optical fiber grating are serially connected via a plurality of optical connectors $C_1$ to $C_n$ to a port $P_a$ of an optical circulator 28 which is a directional coupler. The optical reflectors $FG_1$ to $FG_n$ are detachably connected to one another via their corresponding optical connectors $\lambda_1$ to $\lambda_n$.

The individual optical reflectors $FG_1$ to $FG_n$ are set to have demultiplexing characteristics different from each other, such that the optical reflectors arranged closer to the optical circulator 28 (in the earlier stages) transmit therethrough wavelength components for a larger number of channels, whereas the optical reflectors in the later stages transmit therethrough a part of the wavelength components transmitted through the optical reflectors arranged upstream thereof. Further, the individual optical reflectors $FG_1$ to $FG_n$ are set to reflect wavelength components other than those in their respective transmission wavelength bands set as above.

More specifically, in the case where the optical reflector $FG_1$ in the first stage has such a demultiplexing characteristic that, of WDM signal light including a plurality of wavelength components $\lambda_1$ to $\lambda_n$, a specific wavelength component $\lambda_i$ thereof is transmitted therethrough but the rest of wavelength components $\lambda_1$ to $\lambda_{i-1}$, $\lambda_{i+1}$ to $\lambda_n$ are reflected thereby; the optical reflector $FG_2$ in the second stage is set to have such a demultiplexing characteristic that, of the wavelength components $\lambda_1$ to $\lambda_1$, specific wavelength components $\lambda_1$ to $\lambda_{i-1}$ or the like are transmitted therethrough but the remaining wavelength component $\lambda_i$ is reflected thereby. The optical reflector $FG_3$ in the third stage is set to have such a demultiplexing characteristic that, of the wavelength components $\lambda_1$ to $\lambda_{i-1}$, specific wavelength components $\lambda_1$ to $\lambda_{i-2}$ or the like are transmitted therethrough but the remaining wavelength component $\lambda_{i-1}$ is reflected thereby. Similarly, the optical reflectors in the later stages are set to have their corresponding demultiplexing characteristics having transmission wavelength bands narrower than those of the respective optical reflectors arranged upstream thereof.

The operation of this ADM will now be explained. In FIG. 18, the optical reflector $FG_n$ in the last stage is of a total reflection type, whereas the optical reflector $FG_{n-1}$ arranged upstream thereof has such a demultiplexing characteristic as to transmit therethrough the wavelength component $\lambda_1$ but reflect the other wavelength components.

The WDM signal light including a plurality of wavelength components $\lambda_1$ to $\lambda_i$ entering the port $P_{in}$ is guided toward the optical reflectors $FG_1$ to $FG_n$ via the port $P_a$ of the optical circulator 28. The optical reflectors $FG_1$ to $FG_n$ reflect and transmit, in accordance with their own demultiplexing characteristics, wavelength components incident thereon from the upstream side thereof. Consequently, the optical reflector $FG_1$ in the first stage reflects the wavelength components $\lambda_{i+1}$ toward the optical circulator 28, and retransmits therethrough the wavelength components $\lambda_1$ to $\lambda_i$ that have once been transmitted therethrough and then reflected by and returned from the optical reflectors $FG_2$ to $FG_n$ so as to guide them toward the optical circulator 28.

Therefore, when no desirable wavelength component is dropped or added, WDM signal light entering the port $P_{in}$ can be guided to the port $P_{out}$ as it is.

When the optical reflector $FG_n$ is removed from the optical connector $C_n$, the wavelength component $\lambda_1$ can be dropped from the optical connector $C_n$. When a wavelength component $k_{a1}$ at the same wavelength as the wavelength component $\lambda_1$ is added to the optical connector $C_n$ in the state where the optical reflector $FG_n$ is removed, this wavelength component $\lambda_{a1}$ is transmitted through the optical reflectors $FG_{n-1}$ to $FG_1$ in the earlier stages so as to be directed toward the port $P_{out}$ of the optical circulator 28.

When the optical reflector $FG_3$ or the like located in the intermediate stage is removed, the wavelength components $\lambda_1$ to $\lambda_{i-1}$ can be dropped from the optical connector $C_3$. When at least one wavelength component at the same wavelength as any of the wavelength components $\lambda_1$ to $\lambda_{i-1}$ is added to the optical connector $C_3$ in the state where the optical reflector $FG_3$ is removed, thus added wavelength component is transmitted through the optical reflector $FG_1$ to the optical circulator 28, so as to be directed toward the port $P_{out}$.

Thus, this ADM exhibits excellent effects that, as the optical reflectors $FG_1$ to $FG_n$ satisfying the above-mentioned demultiplexing characteristic conditions are appropriately attached to or detached from the port $P_{in}$ of the optical circulator 28, desirable wavelength components can be dropped or added.

Since the number of connected optical reflectors $FG_1$ to $FG_n$ can be set arbitrarily as long as the above-mentioned demultiplexing characteristic conditions are satisfied, an ADM having a very high degree of freedom can be provided.

Figure 4:
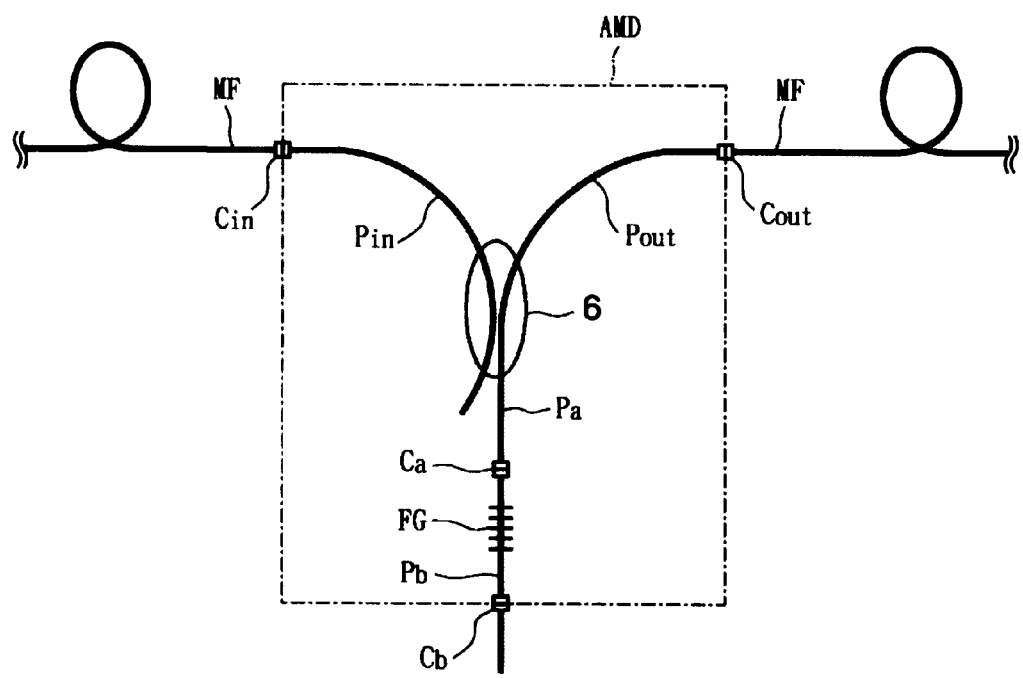
FIG. 4 is a view showing a configuration of a second specific example of the optical I/O module according to the first embodiment shown in FIG. 2.

Though the case using the optical circulator 28 is explained, the optical fiber coupler 6 shown in FIG. 4 allows to be used instead. Not only the optical fiber gratings but also optical filters such as dielectric multilayer filters may be used as the optical reflectors $FG_1$ to $FG_n$. The optical waveguide for guiding the signal light is not restricted to optical fibers, either.

A modified example of the sixth embodiment will be explained with reference to FIG. 19. The ADM shown in FIG. 18 is configured such that the optical reflectors $FG_1$ to $FG_n$ are serially connected to a specific port $P_a$ of the optical circulator 28 so as to form a branch.

Figure 19:
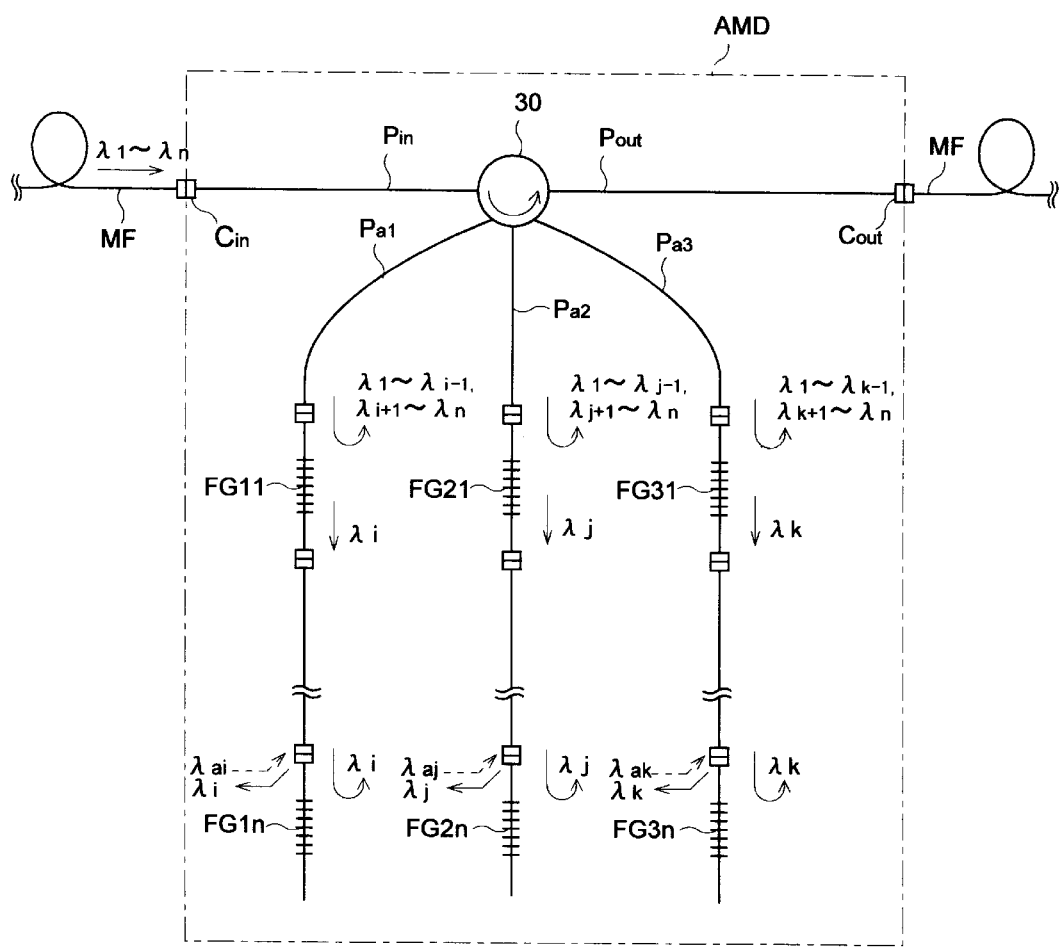
FIG. 19 is a view showing a configuration of a modified example of the optical I/O module according to the sixth embodiment shown in FIG. 18.

On the other hand, the ADM shown in FIG. 19 has a configuration in which an optical circulator 30 having a larger number of intermediate ports, each port being connected to at least one optical reflector, thereby forming parallel branches. The optical circulator 30 shown in FIG. 19 comprises five ports $P_{in}$, $P_{out}$, $P_{a1}$, $P_{a2}$, $P_{a3}$, thereby the WDM signal light entering the port $P_{in}$ successively propagates to the ports $P_{a1}$, $P_{a2}$, $P_{a3}$, $P_{out}$ in this order.

The optical reflectors $FG_{11}$ to $FG_{1n}$, $FG_{21}$ to $FG_{2n}$, $FG_{31}$ to $FG_{3n}$ connected to the respective ports $P_{a1}$, $P_{a2}$, $P_{a3}$ satisfy, port by port, demultiplexing characteristic conditions similar to those of the plurality of optical reflectors $FG_1$ to $FG_n$ shown in FIG. 18.

Namely, they are set such that the optical reflectors arranged closer to the optical circulator 30 (in the earlier stages) transmit therethrough wavelength components for a larger number of channels, whereas the optical reflectors in the later stages transmit therethrough a part of the wavelength components transmitted through the optical reflectors arranged upstream thereof.

More specifically, the optical reflector $FG_{11}$ connected to the port $P_{a1}$ transmits therethrough a wavelength component $\lambda_i$ but reflects the rest of wavelength components $\lambda_1$ to $\lambda_{i-1}$, $\lambda_{i+1}$ to $\lambda_n$. The optical reflector $FG_{1n}$ reflects the wavelength component $\lambda_i$. The optical reflector $FG_{21}$ connected to the port $P_{a2}$ transmits therethrough a wavelength component $\lambda_j$ but reflects the rest of wavelength components $\lambda_1$ to $\lambda_{j-1}$, $\lambda_{j+1}$ to $\lambda_n$. The optical reflector $FG_{2n}$ reflects at least the wavelength component $\lambda_j$. The optical reflector $FG_{31}$ connected to the port $P_{a3}$ transmits therethrough a wavelength component $\lambda_k$ but reflects the rest of wavelength components $\lambda_1$ to $\lambda_{k-1}$, $\lambda_{k+1}$ to $\lambda_n$. The optical reflector $FG_{3n}$ reflects at least the wavelength component $\lambda_k$. Optical fiber gratings are employed as the individual optical reflectors $FG_{11}$ to $FG_{1n}$, $FG_{21}$ to $FG_{2n}$, $FG_{31}$ to $FG_{3n}$ and are detachably connected to each other via optical connectors.

The operation of thus configured ADM will now be explained. When WDM signal light including a plurality of wavelength components $\lambda_1$ to $\lambda_n$ enters the port $P_{in}$, the wavelength components $\lambda_1$ to $\lambda_n$ are totally reflected due to the overall demultiplexing characteristic of the optical reflectors $FG_{11}$ to $FG_{1n}$, $FG_{21}$ to $FG_{2n}$, $FG_{31}$ to $FG_{3n}$, so as to be emitted to the port $P_{out}$.

When the optical reflector $FG_{11}$ is removed from its optical connector, the wavelength component $\lambda_i$ is dropped from the optical connector. When a wavelength component $\lambda_{ai}$ at the same wavelength as the wavelength component $\lambda_i$ is added to this optical connector, it is transmitted through the optical reflector $FG_{11}$ so as to be emitted to the port $P_{out}$ of the optical circulator 30.

Also, when the optical reflectors $FG_{2n}$ and $FG_{3n}$ are removed from their optical connectors, the wavelength components $\lambda_j$ and $\lambda_k$ are dropped from these optical connectors, respectively. When wavelength components $\lambda_{aj}$, $\lambda_{ak}$ at the same wavelengths as the wavelength components $\lambda_j$, $\lambda_k$ are added, the wavelength components $\lambda_{aj}$, $\lambda_{ak}$ pass through the optical reflectors $FG_{21}$, $FG_{31}$, so as to be directed toward the port $P_{out}$ of the optical circulator 30.

Thus, this ADM exhibits excellent effects that, as optical reflectors satisfying predetermined demultiplexing characteristic conditions are appropriately attached to or detached from a plurality of ports $P_{a1}$, $P_{a2}$, $P_{a3}$ of the optical circulator 30, desirable wavelength components can be dropped or added. In particular, an optical add-drop multiplexer having a very high degree of freedom and excellent expandability can be provided.

Here, in place of each optical reflector shown in FIG. 18 or 19, the light-reflecting device RD including the control mechanism CNT shown in FIG. 5 may be employed so as to control the individual demultiplexing characteristic.

As explained in the foregoing, in accordance with the present invention, by simply adjusting the demultiplexing characteristic of an optical reflector, a wavelength component to be dropped or added can arbitrarily be set without breaking an optical transmission line connected to the first and second ports of a directional coupler constituting a part of the transmission line. As a consequence, an optical add-drop multiplexer which is quite easy to operate and is excellent in degree of freedom and expandability can be provided. Further, there can be provided an optical I/O module which can be realized with a small number of constituents, thereby cutting down its cost.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical I/O module adapted to be inserted in a transmission line through which first signal light including one or more wavelength components propagates, said optical I/O module constituting a part of said transmission line and having input and output terminals for allowing said first signal light propagating through said transmission line to be inputted and outputted, said optical I/O module comprising:

a first light-reflecting device reflecting a part of said wavelength components included in said first signal light; and a first directional coupler having a first port device optically connected to said input terminal, a second port device optically connected to said output terminal, and a third port device optically connected to said first light-reflecting device;

wherein said first signal light from said input terminal captured via said first port device is guided to said first light-reflecting device by way of said third port device, and a reflected component from said first light-reflecting device captured via said third port device is guided to said output terminal by way of said second port device.

2. An optical I/O module according to claim 1, wherein said first directional coupler includes one of an optical fiber coupler and an optical circulator.

3. An optical I/O module according to claim 1, further comprising a second directional coupler having:

a fourth port device for capturing second signal light;

a fifth port device optically connected to said third port device via said first light-reflecting device, said second signal light captured via said fourth port device being guided to said first light-reflecting device by way of said fifth port device, a transmitted component transmitted through said first light-reflecting device from said third port device toward said fifth port device being captured via said fifth port device; and a sixth port device for outputting said transmitted component captured via said fifth port device.

4. An optical I/O module according to claim 3, wherein each of said first and second directional couplers includes one of an optical fiber coupler and an optical circulator.

5. An optical I/O module according to claim 1, wherein said first directional coupler further comprises a seventh port device for capturing third signal light, said third signal light successively passing through said seventh port device and said second port device so as to be guided to said output terminal.

6. An optical I/O module according to claim 5, further comprising a second light-reflecting device for reflecting a part of a plurality of wavelength components, said second light-reflecting device being optically connected to said fourth port device of said first directional coupler.

7. An optical I/O module according to claim 4, further comprising a second light-reflecting device for reflecting a part of a plurality of wavelength components;

wherein said first directional coupler further comprises an eighth port device optically connected to said second light-reflecting device, at least a part of said first signal light captured via said first port device being guided to said second light-reflecting device by way of said eighth port device; and wherein said second directional coupler further comprises a ninth port device optically connected to said eighth port device via said second light-reflecting device, at least a part of said second signal light captured via said fourth port device being guided to said second light-reflecting device by way of said ninth port device.

8. An optical I/O module according to claim 1, wherein said first directional coupler includes an optical fiber coupler further comprising a tenth port device for capturing fourth signal light, said fourth signal light captured via said tenth port device being guided to said output terminal by way of said second port device; and wherein said first light-reflecting device includes a refractive index grating formed at a portion in which said first port device, second port device, third port device, and tenth port device are integrated together so as to be optically coupled to each other.

9. An optical I/O module according to claim 1, wherein said first light-reflecting device includes a plurality of light-reflecting units each having a different transmission wavelength; and wherein said first directional coupler includes, as said third port device, an optical circulator having a plurality of ports, each of said ports optically connected to associated one of said light-reflecting units.

10. An optical I/O module according to claim 1, wherein said first light-reflecting device includes a plurality of light-reflecting units each having a different transmission wavelength, said plurality of light-reflecting units being serially arranged while being optically connected to adjacent one or ones at one or both ends of each unit, each unit comprising a structure capable of incorporating itself into and removing itself from a line defined by said units arranged serially.

11. An optical I/O module according to claim 1, wherein said first light-reflecting device comprises an optical waveguide having a reflection area for reflecting a part of said wavelength components included in said first signal light, and a conversion system for changing a demultiplexing characteristic of a part of said reflection area of said optical waveguide so as to transmit therethrough a desirable wavelength component in said wavelength components to be reflected by said reflection area.

12. An optical I/O module according to claim 11, wherein said conversion system comprises a structure for applying at least one of heat, distortion, and light at a specific wavelength to a specific part of said reflection area.

13. An optical I/O module adapted to be inserted in a transmission line through which first signal light including one or more wavelength components propagates, said optical I/O module constituting a part of said transmission line and having input and output terminals for respectively allowing said first signal light propagating through said transmission line to be inputted and outputted, said optical I/O module comprising:

first and second light-reflecting devices each reflecting a part of said wavelength components included in said first signal light;

a first optical fiber coupler having a first port optically connected to said input terminal, a second port optically connected to said output terminal, a third port optically connected to said first light-reflecting device, and a fourth port optically connected to said second light-reflecting device, wherein said first signal light from said input terminal captured via said first port is guided to said first and second light-reflecting devices by way of said third and fourth ports, respectively; and a second optical fiber coupler having a fifth port for capturing second signal light, a sixth port optically connected to said third port via said first light-reflecting device, a seventh port optically connected to said fourth port via said second light-reflecting device, and an eighth port, wherein said second signal light captured via said fifth port is guided to said first and second light-reflecting devices by way of said sixth and seventh ports, respectively, and respective transmitted components transmitted through said first and second light-reflecting devices from said third and fourth ports toward said sixth and seventh ports are guided to said output terminal by way of said eighth port.

14. An optical I/O module adapted to be inserted in a transmission line through which first signal light including one or more wavelength components propagates, said optical I/O module constituting a part of said transmission line and having input and output terminals for allowing said first signal light propagating through said transmission line to be inputted and outputted, said optical I/O module comprising:

a first optical fiber coupler having a first port optically connected to said input terminal, a second port optically connected to said output terminal, a third port for outputting a part of said first signal light captured via said first port, and a fourth port for capturing second single light; and a light-reflecting device for reflecting a part of said wavelength components included in said first signal light, said light-reflecting device including a refractive index grating formed at a portion in which said first, second, third, and fourth ports are integrated together so as to be optically coupled to each other;

wherein, of said wavelength components of said first signal light captured via said first port, a wavelength component transmitted through said light-reflecting device is taken out from said third port, whereas said second signal light captured via said fourth port is guided to said output terminal by way of said second port.

15. A light-reflecting device comprising:

an optical waveguide having a reflection area for reflecting a part of a plurality of wavelength components; and a conversion system for changing a demultiplexing characteristic of a part of a reflection area of said optical waveguide so as to transmit therethrough a desirable wavelength component in said wavelength components to be reflected by said reflection area.

16. A light-reflecting device according to claim 15, wherein said conversion system comprises a structure for applying at least one of heat, distortion, and light at a specific wavelength to a specific part of said reflection area.

17. A light-reflecting device according to claim 16, wherein said conversion system has a plurality of conversion units prepared so as to correspond to respective parts of said reflection area to which one of heat, distortion, and light at a specific wavelength is applied, said conversion units being arranged along said optical waveguide.

* * * * *